United States Patent [19]

Kesting et al.

[11] Patent Number: 4,871,494
[45] Date of Patent: Oct. 3, 1989

[54] PROCESS FOR FORMING ASYMMETRIC GAS SEPARATION MEMBRANES HAVING GRADED DENSITY SKINS

[75] Inventors: Robert E. Kesting, Eisenfeld, Fed. Rep. of Germany; Alfred K. Fritzsche, Manchester; Milton K. Murphy, Clayton, both of Mo.; Alan C. Handermann, Matthews, N.C.; Clint A. Cruse, St. John; Raymond F. Malon, Edmundson, both of Mo.

[73] Assignee: Permea, Inc., St. Louis, Mo.

[21] Appl. No.: 66,751

[22] Filed: Jul. 6, 1987

Related U.S. Application Data

[63] Continuation-in-part of Ser. No. 897,566, Aug. 15, 1986, abandoned.

[51] Int. Cl.$^4$ .............................................. D01D 5/247
[52] U.S. Cl. ........................................ 264/41; 264/102; 264/184; 264/205; 264/290.1; 264/211.15; 264/211.16; 264/232; 264/233; 264/234; 264/340; 264/345; 264/558; 264/561; 264/562; 264/563; 210/500.23
[58] Field of Search ................ 264/558, 209.1, 233, 264/49, 41, 102, 184, 205, 211.15, 211.16, 232, 234, 340, 345, 561, 562, 563; 210/500.23, 500.41

[56] References Cited

U.S. PATENT DOCUMENTS

| | | | |
|---|---|---|---|
| 3,133,137 | 5/1964 | Loeb et al. | 264/49 |
| 3,752,784 | 8/1973 | Jenkins | 260/2.5 R |
| 3,792,135 | 2/1974 | Brown et al. | 264/41 |
| 3,917,777 | 11/1975 | Asada et al. | 264/41 |
| 3,950,257 | 4/1976 | Ishii et al. | 210/500 |
| 4,230,463 | 10/1980 | Henis et al. | 55/16 |
| 4,351,860 | 9/1982 | Yoshida et al. | 427/246 |
| 4,544,484 | 10/1985 | Sundot | 210/500.2 |

FOREIGN PATENT DOCUMENTS

60172312  9/1985  Japan .............................. 210/500.41

OTHER PUBLICATIONS

Guttman, Viktor: *Solvent Concepts,* Chemtech, 4/77, pp. 255–263.
Tweedle; Kutowy; Thayer; Sourirajan; Ind. Eng. Chem., Prod. Res. Dev., 22, 320 (1983).

*Primary Examiner*—Hubert Lorin

[57] ABSTRACT

A process for forming high free volume, asymmetric gas separation membranes having graded density skins and macrovoid-free morphology from a solvent system comprising a Lewis acid, Lewis base, and a Lewis acid:-base complex which dissolve hydrophobic polymers. The dopes have high total solids, high viscosity and low coagulation (g) values which enhance rapid gelation without the formation of macrovoids and which minimize densification. The dope solvent system complexes are readily disassociated by the coagulation medium and the component molecules are miscible in the medium which provides for rapid desolvation of the formed membrane thus providing a membrane having low residual solvent retention.

24 Claims, 4 Drawing Sheets

SCHEMATIC REPRESENTATION OF AN ASYMMETRIC BILAYER AND A GRADED DENSITY SKIN ASYMMETRIC TRILAYER $\underline{SOL}$ UF
17% TOTAL SOLIDS
~2000 cps @ 23°C
g= 4.4
A:B = 0.42
$\underline{GEL}$
MACROVOID-RIDDEN
$O_2$ P/125; $\alpha^{O_2}_{N_2}$ 3.1
COATING INEFFECTIVE

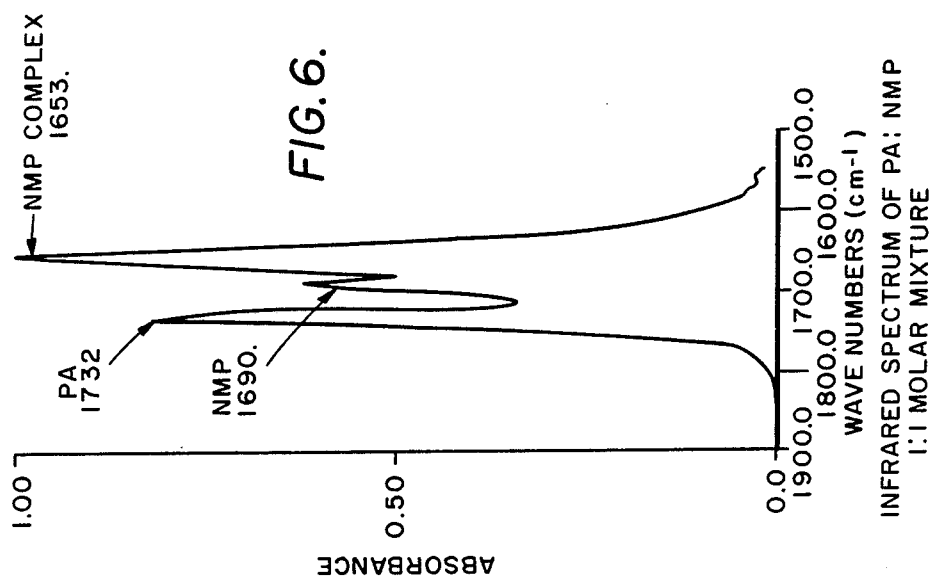
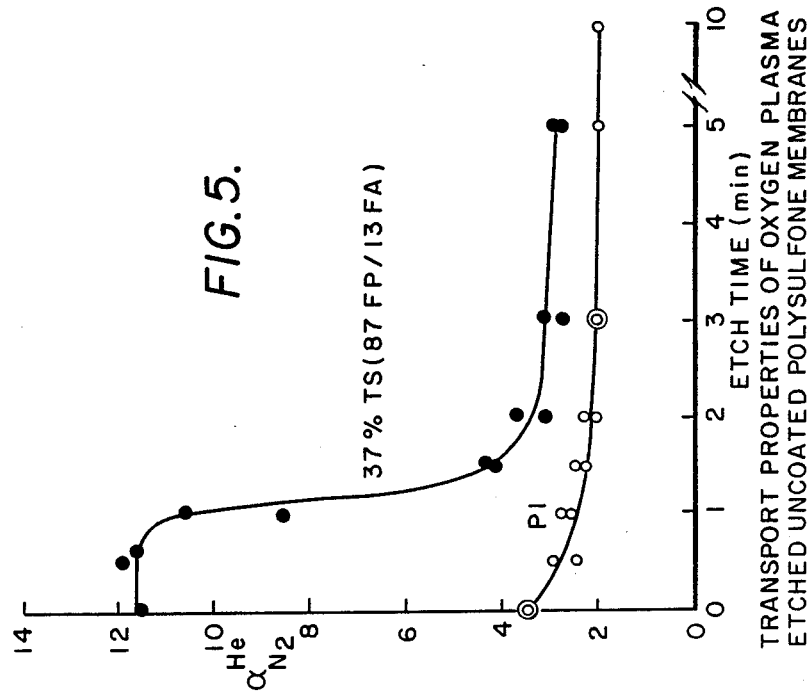

CROSS SECTION, OUTER PORTION AND GRADED DENSITY SKIN OF ASYMMETRIC TRILAYER GAS SEPARATION MEMBRANE

CROSS SECTION, OUTER PORTION AND SKIN OF ASYMMETRIC BILAYER GAS SEPARATION MEMBRANE

CROSS SECTION, POROUS SUBSTRUCTURE PORTION OF ASYMMETRIC BILAYER GAS SEPARATION MEMBRANE

CROSS SECTION, POROUS SUBSTRUCTURE PORTION OF ASYMMETRIC TRILAYER GAS SEPARATION MEMBRANE

PROCESS FOR FORMING ASYMMETRIC GAS SEPARATION MEMBRANES HAVING GRADED DENSITY SKINS

This is a continuation-in-part, of application Ser. No. 897,566, filed Aug. 15, 1986 now abandoned.

This invention relates to a process for forming asymmetric membranes having graded density skins for separating gases. In another aspect, the invention relates to a membrane dope comprising a solvent system of Lewis acids and Lewis bases and Lewis acid:base complexes which dissolves high weight percent total solids of membrane forming polymers. In yet another aspect, the invention relates to a process for forming gas separation membranes from high viscosity dopes having low coagulation (g) values which enhance rapid gelation and desolvation resulting in macrovoid-free membranes having high free volume.

The viability of the use of membranes for gas separations as compared to other separation procedures such as adsorption, absorption, and liquefaction often depends on the cost of the apparatus and its operation, including energy consumption, degree of selectivity of separation and rate of separation. Other important considerations are the total pressure loss caused by the apparatus conducting the separation process, the useful life for such apparatus and the size and the ease of use of such apparatus. Thus, membranes are sought which provide desired selectivities of separation, fluxes and strength. Moreover, in order to be commercially attractive on an economic basis, the membranes are preferably capable of being manufactured in large quantities while achieving a reliable product quality and being readily and relatively inexpensively assembled into a permeator. Particularly advantageous membranes are unitary, asymmetric, hollow fiber membranes which have a relatively thin separating layer, barrier layer, or active layer, integral with a porous substrate which provides support to the separating layer and offers little, if any, resistance to passage of gases. In order to prepare these asymmetric membranes, a unitary membrane structure must be formed which possesses diametrically opposed structures. The separating layer must be formed such that it is thin and possesses few, if any, pores or other defects. On the other hand, the conditions of formation of the asymmetric membrane, must also result in a support structure which is highly open such that it offers low resistance to gas flow. Numerous proposals have been made pertaining to the preparation of asymmetric membranes prepared in film and in hollow fiber form. In general, asymmetric membranes are prepared in film form by casting a solution of the polymer onto a surface, e.g., polished glass. The cast polymer solution may be allowed to coagulate at least partially, in air or a gaseous or vaporous environment and then immersed in a liquid coagulant. Considerable flexibility exists in preparing film membranes. For instance, since the polymer solution is placed on a support, the membrane precursor structure need not be self-supporting at least until after coagulation is completed. Similarly, since one surface of the cast membrane is in contact with the support, each side of the membrane may be subjected to different coagulation conditions thereby permitting substantially different structures to be achieved at each surface of the membrane. Accordingly, membranes having a relatively thin layer with essentially an absence of pores may be achieved at one surface of the film membrane, while the remainder of the membrane may be relatively porous. Moreover, since the film membrane precursor is supported, the coagulation conditions, including coagulation times, can vary widely to achieve the desired film membrane structure. In some instances, however, film membranes may not be as attractive as hollow fiber membranes due to the need for film membranes to be supported to withstand operating conditions and the overall complexity of apparatus containing film membranes. Membranes in the configuration of hollow fibers may overcome some of the deficiencies of film membranes for many separation operations. Hollow fibers are generally self supporting even under severe operating conditions and can provide a greater amount of membrane surface area per unit volume of separation apparatus than that which can be provided by film membranes. Thus, a separation apparatus containing hollow fibers can be attractive from a standpoint of convenience, size and rediuced complexity of design.

Many different process considerations are involved in making a hollow fiber membrane than are involved in making a film membrane. For instance, no solid support, or interface can be provided in a process for spinning hollow fiber membranes. Moreover, in spinning procedures, the polymer solution must be of sufficient viscosity to provide a self-supporting extrudate prior to and during gelation, and the gelation must be quickly effected after extrusion such that the hollow fiber membrane is not adversely affected.

Processes for the formation of asymmetric membranes must not only meet the criteria of forming the membranes, but also must be compatible with hollow fiber spinning capabilities. Hence, many constraints are placed upon the techniques available to produce asymmetric hollow fiber membranes. Commonly, in hollow fiber membrane spinning procedures, a solution of the polymer, i.e., a dope to form the hollow fiber membrane in a solvent system, is extruded from a spinnerette suitable for forming a hollow fiber configuration. A gas or liquid is injected into the bore of the hollow fiber extrudate such that the hollow fiber configuration can be maintained. The hollow fiber extrudate must quickly be coagulated, e.g., by contact with a non-solvent for the polymer, such that the hollow fiber configuration can be maintained. The hollow fiber spinning process contains many variables which may affect the structure or morphology of the hollow fiber membrane such as the conditions of the polymer solution when extruded from the spinnerette, the nature of the fluid maintained in the bore of the hollow fiber membrane extrudate, the environment to which the exterior of the hollow fiber extrudate is subjected, the rapidity of coagulation of the polymer and the hollow fiber extrudate and the like. Since the hollow fiber forming process is one of coagulation of the polymer from a polymer solution, the nature of the solvent system for the polymer is highly influential in determining the morphology of the hollow fiber membrane and its gas separation properties.

The solvent system must possess numerous properties in order to be suitable for forming asymmetric membranes. For example, the solvent system must be capable of dissolving the polymer for forming the hollow fiber membrane, but yet permit the polymer to readily coagulate to form the asymmetric structure. Furthermore, when hollow fiber membranes are desired, the solvent system should enable the polymer solution to be prepared having suitable viscosities for hollow fiber membrane formation.

A hollow fiber spinning dope should be comprised of a solvent system which is miscible with the non-solvent used to assist in coagulation of the polymer and should be capable of being removed, e.g., by washing from the coagulated structure, such that the membrane is not unduly plasticized or densified and thereby made undesirable for gas separation. Moreover, the solvent system should not exhibit excessive heats of dilution in the non-solvent used to assist in coagulating the polymer.

More recently, asymmetric gas separation membranes have been spun from solvent systems which include the non-solvent in the solvent system with the polymer which comprises the spinning dope. In this way greater control of the gelation is achieved and simpler coagulation procedures are possible. All components of the solvent system, the spinning dope, the coagulation medium, and the washing fluids should work in cooperation in order to avoid undesired morphology in separating skin densities, membrane strengths and the like. Moreover, in the quantities required to effect, e.g., coagulation, washing, etc., the expense of certain nonaqueous materials could be a factor in the economics of the spinning process. Accordingly, it is desired to use highly safe, readily available materials, such as water, whenever possible in the spinning process, especially as a coagulation medium and in washing to remove solvent from the hollow fiber membrane. The ability to use water, depends to a large extent, upon the properties of the solvent system with respect to water and the polymer's physical properties contained in the spinning dopes as well as the impact of water upon removing solvents and non-solvents from the formed membrane.

Loeb and Sourirajan, U.S. Pat. No. 3,133,132, demonstrated for the first time that it was possible through the preparation of asymmetric membranes to decouple the so called intrinsic permeabilities from intrinsic separation factors which result from the use of dense membranes. Asymmetric membranes taught by Loeb and Sourirajan and multicomponent membranes taught by Henis and Tripodi, U.S. Pat. No. 4,230,463, herein incorporated by reference, even though presenting higher permeabilities than dense membranes, still couple these permeabilities with separation factors in an interdependency. The high permeability (P/l) values at constant or improved, and in some cases at essentially intrinsic separation factor presented by the present invention, amounts to a second decoupling which is achieved by the modification of the membrane skin structure. As demonstrated by the elevated first heat $T_g$s of the membranes according to the invention, the origin of increased permeability is related to increased free volume. Selectivity is maintained constant or improved because the membranes are asymmetric and macrovoid-free and have graded density skin.

Loeb and Sourirajan disclosed a method for preparing a modified cellulose acetate membrane for desalination of water by first casting a solution of cellulose acetate as a thin layer, and then forming a dense membrane skin on the thin layer through various techniques such as solvent evaporation followed by quenching in cold water. The formation of these dense-skinned membranes generally involved a final annealing treatment in hot water. The membranes prepared by the Loeb-Sourirajan method are composed of two distinct regions made of the same cellulose acetate material, a thin, dense, semipermeable skin and a less dense, void-containing, nonselective support region. Since the membranes are not of essentially the same density throughout their structure, they fall within the definition of anisotropic membranes. Because of these distinct regions and the difference in membrane properties which can be observed depending on which surface of the membrane faces a fluid feed mixture, the Loeb-Sourirajan membranes can be described as being asymmetric.

Solvent system dope spun, asymmetric membranes for gas separations were more recently advanced by Henis et al, whereby a multicomponent membrane for gas separation comprised of a coating in contact with a porous separation membrane was taught with the separation properties of the multicomponent membranes being principally determined by the material of the porous separation membrane as opposed to the material of the coating. The multicomponent membranes provided gas separations membranes which could be fabricated from a wide variety of gas separation polymeric materials and thus enable greater latitude in selecting such a membrane material which is advantageous for a given gas separation. These multicomponent membranes were solvent spun from dopes of glassy, aromatic sulfone polymers and other polymers and were gelled in water and/or other polar media. Separation factors for at least one pair of gases were increased by at least 35 percent through utilization of the multicomponent membranes; however, separation factor and permeability remain coupled, that is, adjustment or increase in, for example, separation factor would be at the cost of reduced permeation rate and vice versa.

SUMMARY OF THE INVENTION

A process and spinning dope is presented for preparing asymmetric gas separation membranes having graded density skins and macrovoid-free morphology comprised of aromatic sulfone polymers wherein the membranes have increase free volume as evidenced by the membrane first heat $T_g$ which is greater than the $T_g$ of a bulk sample of the polymers. The resultant membranes exhibit high permeabilities and the potential for intrinsic separation factors realized after any porous defects of the membrane are sealed with a highly permeable silicone polymer or similar coating. The membranes exhibit selectivities that can approach those of dense films of the polymers and permeabilities which are much greater than those of state-of-the-art, asymmetric membranes of the same polymer, for example, as taught by Henis et al.

The process for forming high free volume, asymmetric gas separation membranes having graded density skins results from utilizing a dope of a solvent system comprised of Lewis acids, Lewis bases and Lewis acid:base complexes which dissolve aromatic sulfone polymers. The dopes have high total solids, high viscosity and low coagulation (g) values which enhance rapid gelation and allow rapid desolvation when coagulated in water without undue densification or formation of macrovoids.

The graded density skin membranes result from, for example, spinning or casting dopes comprised of aromatic sulfone polymers in a solvent system of Lewis acids, Lewis bases, and Lewis acid:base complexes capable of dissolving the polymer and being readily disassociated by polar coagulation media, which provides macrovoid-free, asymmetric membranes possessing high free volume. The invention is concerned with the preparation of efficient, asymmetric, gas separation membranes from various glassy, hydrophobic polymers. The performance efficiencies of the coated graded density skin membranes are determined by the comparison of permeability and selectivity vs. temperature curves for state-of-the-art membranes as provided commercially by Permea, Inc., under the tradename of PRISM ® separators based on the Henis et al teachings. The permeabilities of the inventive membranes are considerably greater than the Henis et al membranes while maintaining either constant or improved separation factor which can approach intrinsic levels. The reason for the greater permeability in the graded density skin membranes lies in part in the increased free volume in their skin regions which in turn is a result both of sol structure prior to gelation and of the kinetics of gelation and desolvation of the sols from which the membranes are spun or cast. The separation factor is maintained at least at a constant level or increased, in other words, decoupled from permeability because the skins of the inventive membrane exhibit a density gradient, becoming less dense with increasing proximity to the skin/matrix interface. The as-spun membranes have a fine and uniform structure with the potential of achieving intrinsic separation factor. This potential is realized after any porous defects have been filled with highly permeable silicone polymer or equivalent coating material. The densest portion of the graded density skin, the skin of the skin, is effectively as dense as a thick dense film and hence exhibits essentially the same or intrinsic separation factor as the latter once porous defects have been sealed by coating.

The membranes are a result of processes involving viscous sols which are close to the point of incipient gelation. The sols can consist of an aromatic sulfone polymer, for example, polysulfone, polyphenylsulfone, polyethersulfone and the like dissolved in a solvent system consisting of a Lewis acid, Lewis base and a Lewis acid:base. The fact that the Hildebrand parameter of the solvent system is reasonably close to that of the polymer results in fine and homogeneous sol and hence gel structures which have the potential for high gas separation efficiency. High sol viscosity and low non-solvent tolerance kinetically hinder densification of the gel and prevent the formation of macrovoids. At gelation, the Lewis acid:base complexes are rapidly disassociated by water or other polar medium into their smaller component molecules which, together with any original uncomplexed acid and base components, are readily extracted during gelation and washing steps. All of these factors act in concert to increase the rates of gelation and desolvation and to minimize densification with the end result that unusually high free volume and graded densities are maintained in the skin layers of the membranes.

The above-described membranes can be prepared by a process comprising:

(a) dissolving the polymers in a solvent solution of Lewis acids and Lewis bases and complexes formed of the Lewis acids and bases, wherein the Lewis acids, Lewis bases, Lewis acid:base complex solvent system has a Hildebrand parameter less than about 1.5 cal½/cm$^{3/2}$ of the Hildebrand parameter of the polymer;

(b) creating a dope or spinning dope of the solvent system and polymers which is near the gel point, the dope comprised of greater than about 30% by weight total solids sol;

(c) configuring the dope into a form suitable for use as an asymmetric gas separation membrane and, for a hollow fiber membrane, comprising spinning the dope through a tube-in-orifice spinneret and injecting coagulation fluid through the orifice;

(d) coagulating the formed dope in a coagulating medium;

(e) desolvating the resulting formed asymmetric gas separation membrane having graded skin and macrovoid free morphology through rapid disassociation of solvent complex;

(f) washing the membrane at ambient temperatures in a polar medium; and (g) drying the membrane at temperatures of from about abient to about 20° C. below the glass transition temperature.

The process may further comprise degassing and filtering the spinning dope before spinning, and desolvating and washing of the formed membrane to result in a membrane having less than about 0.5 percent by weight residual solvent. The dope may be spun sequentially into a dry air gap and then into a coagulation medium or spun by a wet process directly into the coagulation medium. Also, the injected coagulation fluid into the orifice of the spinneret and the coagulation medium into which the dope is spun may be comprised of water. The spinning dope may be comprised of greater than about 30 percent by weight of the polymer and the spinning dope may have a viscosity of greater than about $5 \times 10^4$ cps at spinning temperatures necessary to produce macrovoid-free membranes.

Specifics with regard to the above-described features are more fully described in the following discussion of the invention.

DEFINITIONS

For purposes of defining the invention, the following terms and phrases will have the meanings as set out below.

In accordance with the invention, the asymmetric gas separation membranes are comprised of a graded density skin, that is, a skin which exhibits maximum density at the surface which is farther from the porous substructure. The separation membrane is essentially the same material, throughout its structure, i.e., the asymmetric separation membrane is substantially chemically homogeneous as is the graded density skin. The material of the separation membrane exhibits selective permeation for at least one gas of a gaseous mixture over that of at least one remaining gas of the mixture, hence the separation membrane is defined as a "separation" membrane. By describing this separation membrane as asymmetric, it is meant that the membrane has a thin, dense skin supported by a thick, porous substrate (matrix) in which both layers are formed from a single sol by a phase inversion process. The phase inversion process is a general process of membrane manufacture that utilizes a sol which inverts into two interdispersed liquid phases, that is, polymer coated micelles of the dispersed phase in a continuous second liquid phase, prior to, or simultaneously with gelation, at which time the emulsoid nature of what once was a sol is immobilized as a gel. The membranes of this invention advantageously provide the separation of at least one gas fro a gaseous mixture by interaction with the materials of the separation membrane, enhanced by free volume and graded density compared to that of separation membranes having denser effective separation skin thicknesses.

The asymmetric membranes having graded density skins according to the invention are further enhanced for practical utilization for separating gases when the graded density skin is coated with coatings which have a particular relationship respective to the membranes. Some of these relationships can conveniently be stated in terms of relative separation factors and permeabilities with respect to a pair of gases for the separation membranes, coatings and graded density skin.

The coating may be in the form of an essentially non-interrupted membrane, i.e., an essentially non-porous membrane, in contact with the graded density skinned membrane, or the coating may be discontinued, or interrupted. When the coating is interrupted, it is sometimes referred to as an occluding material since it may occlude channels for gas flow, i.e., pores. Preferably the coating is not so thick as to adversely affect the performance of the graded density skinned membrane, e.g., by causing an undue decrease in flux or by causing such a resistance to gas flow that separation factor of the coated membrane is essentially that of the coating. Often the coating may have an average thickness of up to about 10 micrometers.

A separation factor ($\alpha a/b$) for a membrane for a given pair of gases a and b is defined as the ratio of the permeability constant ($P_a$) of the membrane for gas a to the permeability constant ($P_b$) of the membrane for gas b. A separation factor is also equal to the ratio of the permeability ($P_a/l$) of a membrane of thickness l for a gas of a gaseous mixture to the permeability of the same membrane to gas b, ($P_b/l$) wherein the permeability for a given gas is the volume of gas, standard temperature and pressure (STP), which passes through a membrane per square centimeter of surface area, per second, for a partial pressure drop of 1 centimeter of mercury across the membrane per unit of thickness, and is expressed a $P/l = cm^3/cm^2\text{-sec-cmHg}$.

In practice, the separation factor with respect to a given pair of gases for a given membrane can be determined employing numerous techniques which provide sufficient information for calculation of permeability constants or permeabilities for each of the pair of gases. Several of the many techniques, available for determining permeability constants, permeabilities, and separation factors is disclosed by Hwang, et al., *Techniques of Chemistry*, Volume VII, *Membranes in Separations*, John Wiley & Sons, 1975 (herein incorporated by reference) at Chapter 12, pages 296 to 322.

An intrinsic separation factor as referred to herein is the separation factor for a material which has no channels for gas flow across the material, and is the highest achievable separation factor for the material. Such a material may be referred to as being continuous or non-porous. The intrinsic separation factor of a material can be approximated by measuring the separation factor of a compact membrane of the material. However, several difficulties may exist in the determination of an intrinsic separation factor including imperfections introduced in the preparation of the compact membrane such as the presence of pores, the presence of fine particles in the compact membrane, undefined molecular order due to variations in membrane preparation, and the like. Consequently, the determined intrinsic separation factor can be lower than the intrinsic separation factor. Accordingly, a "determined intrinsic separation factor" as employed herein refers to the separation factor of a dry compact membrane of the material.

Coagulation value (g) is a measure of nonsolvent tolerance, or proximity to the point of incipient gelation (PIG). It is defined as the grams of water which when added to 100 g of a sol containing 2 grams of polymer @ 30° C. will effect phase separation, J. Tsugaya and T. Miyano, Jap. Pat. Publ. 58-24, 305 (1983). The lower the g value, the more rapidly a sol will gel when immersed in water resulting in less gel densification. Furthermore, the lower the g value, the less likely will be the formation of macrovoids.

Cohesive energy density (CED) of a liquid is a measure of the forces holding the liquid together. Its most common unit is $cal/cm^3$. CED can be considered as an index of polarity, the higher the CED, the more polar a liquid.

Hildebrand or total solubility parameter is expressed as ($\delta$) $\delta = (CED)^{\frac{1}{2}}$ having the units of $cal^{\frac{1}{2}}/cm^{3/2}$. The single value $\delta$ is a single value gauge of polarity, that is, the higher $\delta$, the higher polarity. The $\delta$ of a polymer is taken as the $\delta$ of the fluid which effects the greatest swelling of a lightly crosslinked, insoluble sample of the polymer. The $\delta$ of a polymer is typically precise to no better than about $\pm 0.2$ units.

Dense, as in dense film refers to the absence of voids $> \sim 5$ angstroms in diameter within the typical structure. However, the thin skins of integrally-skinned membranes, although dense on the whole, invariably contain a few large defects which must be sealed if intrinsic $\alpha$ is to be obtained.

An asymmetric or an integrally-skinned membrane is a two or more layered membrane of the general class first prepared by Loeb-Sourirajan consisting of a thin dense skin supported by a thick porous substructure (matrix) in which both layers are formed from a single sol by a phase inversion process.

First heat $T_g$ is recorded at the first excursion of a differential scanning calorimetry (DSC) sample through the T range and may differ from that obtained in subsequent heats. If the first heat $T_g$ is higher than that of the bulk polymer, and no crosslinking, etc. has occurred, it is evidence that the sample contained a free volume higher than that of the bulk polymer. If the first heat $T_g$ is lower, the presence of residual solvent may be indicated. All of the information relative to increased free volume in a given membrane is lost after the first heat since increased segmental mobility at the $T_g$ leads to loss of excess free volume.

Free volume ($V_f$) is the volume in a dense film which is available for gas permeation; $V_f = V_t - V_o$ where $V_t$ = total macroscopic volume and $V_o$ = volume occupied by vibrating macromolecules. The $V_f$ fraction in a typical glassy polymer is $\sim 0.025$ at its $T_g$.

Glass transition temperature ($T_g$) is the temperature at which the thermal expansion coefficient changes during the course of proceeding from the glassy to the rubbery state. The viscosity at the $T_g = 10^{13}$ poises. Theoretically at a value of 51.6° C. below the $T_6$, the viscosity becomes infinite. The first heat $T_g$ increases with increasing $V_f$.

Gutmann acid (AN) and base (DN) scales provide a numerical ranking of the relative strengths of Lewis acids and bases, respectively.

Macrovoids—the large (10-100 $\mu$m) diameter voids found with the normal sponge-like matrix which itself consists of small 0.1-2 $\mu$m diameter open cells. Macrovoid-containing membranes such as those utilized for ultrafiltration by Tsugaya et al are unsuitable for gas separations. The asymmetric gas separation membranes having graded density skins according to the invention are macrovoid-free or essentially macrovoid-free membranes. Macrovoids originate from sols which are metastable at the sol gel transition as a result of being too fluid or too far removed from the point of incipient gelation (PIG) so that sol inhomogeneities can arise which are then frozen into the membrane structure after gelation as discussed by R. E. Kesting, *Synthetic Polymeric Membranes—A Structural Perspective*, 2nd Edition, Wiley-Intersicence, 1985.

Non-solvent as used here is a liquid which even when heated to ~100° C. will not dissolve more than a trace of the polymer. A weak nonsolvent is defined as having $\Delta(\delta_{nonsolvent}-\delta_{polymer}) < \sim \pm 6$ cal$^{\frac{1}{2}}$/cm$^{3/2}$ and generally speaking, nonsolvent tolerance increases as $\Delta$ decreases. A strong nonsolvent conversely is defined as having a $\Delta > \sim \pm 6$ cal$^{\frac{1}{2}}$/cm$^{3/2}$ Permeability (P) is the rate at which a gas traverses a membrane $$P \frac{vol \cdot thickness}{time \cdot area \cdot pressure} = \frac{cc(STP)cm}{sec\ cm^2\ cm\ Hg}$$

P is also expressed as P/l (P÷thickness) to remove any uncertainties as to actual skin thickness.

Phase inversion is the general process of membrane manufacture that utilizes a sol which inverts into two interdispersed liquid phases; polymer coated micelles of the dispersed phase in a continuous second liquid phase, prior to, or simultaneously with, gelation at which time the emulsoid nature of what once was a sol is immobilized as a gel.

Potential is the unrealized capacity for exhibiting a certain property. The potential for efficient air separation means that the uncoated membrane has sufficient fineness and uniformity of structure and sufficient free volume in the skin, that after coating with a permeable polymer, defects will be sealed and the fiber will yield high permeabilities and approach intrinsic selectivity.

Skin is the thin (~2500A) dense layer observable with scanning electron microscope (SEM) which is found in integrally-skinned (asymmetric) membranes. A skin can be of uniform density in which case the skin and active separating layer are identical, or it can be of graded density in which case the active layer thickness is less than the skin thickness.

Preferred hydrophobic materials or polymers as used in this description refer to water absorption values of between 0.02% and 1.0 % after immersion in water for 24 hours of the materials or polymers as determined by ASTM D-570 6.1 standards; however, it is possible that other hydrophobic materials and polymers with higher water absorption value could be formed into the membrane morphologies of this invention.

Acid gases as used herein are present in most natural gas streams and are comprised of carbon dioxide and hydrogen sulfide. Many gas streams, particularly those used in a refinery or for manufacturing gases, may contain mercaptans, carbon disulfide and carbonyl sulfide; however, these are usually present only as byproducts of some manmade process which involves natural gases containing originally carbon dioxide and hydrogen sulfide.

Wet process is that variation of phase inversion in which gelation occurs as the result of incompatibility which is effected by the immersion of the sol in a nonsolvent gelation medium such as water.

DESCRIPTION OF THE DRAWINGS

For better understanding of the graded density skinned, asymmetric, macrovoid-free gas separation membrane having increased free volume, according to the invention, reference is made to FIGS. 1, 4 and 5 include both comparative and inventive references;

FIGS. 3, 6, 8 and 10 present membranes in accordance with the invention; and

FIG. 2 illustrates a typical ultrafiltration membrane as shown by the photograph taken through the use of a scanning microscope magnification of 160.

FIG. 3 is a photograph taken through the use of a scanning microscope at a magnification of 170 which depicts a membrane which is in accordance with the invention. As can be seen in comparing FIGS. 2 and 3, the ultrafiltration membrane is macrovoid-ridden whereas the gas separation membrane is macrovoid-free.

FIG. 5 is a graphic interpretation of the data collected when comparing art taught asymmetric gas separation membranes with uniform skins and porous substructures as compared to graded density skinned, asymmetric gas separation membranes with active layer and transition layer skin zones and a porous substructure when the membranes are oxygen plasma etched and tested for separation factor using a helium and nitrogen feed stream.

FIG. 6 represents the IR spectrum of a solvent system comprised of equal molar mixtures of NMP and propionic acid showing the NMP:PA complex at approximately 1653, the NMP solvent at 1690 and the propionic acid at 1732 cm$^{-1}$ vs absorbance.

FIG. 7 is a photograph taken through the use of an electron microscope at a magnification of 50,000 of an asymmetric, bilayer, uniform-skinned, porous substrate gas separation membrane taught by the prior art.

FIG. 8 is a photograph taken through the use of an electron microscope at a magnification of 50,000 of a membrane in accordance with the invention, i.e., a graded density skinned, asymmetric gas separation membrane having an active layer, a transition layer and a porous substructure.

FIG. 9 is a photograph taken through the use of a scanning electron microscope at a magnification of 50,000 of a cross section of a portion of the porous substructure of an asymmetric, bilayer gas separation membrane taught by the prior art.

FIG. 10 is a photograph taken through the use of a scanning electron microscope at a magnification of 50,000 of a cross section of a portion of the porous substructure of an asymmetric, trilayer gas separation membrane in accordance with the invention.

ULTRAFILTRATION VS GAS MEMBRANES

Ultrafiltration (UF) is that portion of the spectrum of pressure-driven membrane separation process which concerns itself with the separation of marcomolecules from microsolutes or less successfully with the separation of macromolecules of different sizes. The pore diameter (d) range which is encountered in UF is $10A < d < 1000A$. The nature of the normal pores in UF membranes differs in kind from the nature of the normal pores which are encountered in gas separation membranes. In the latter the normal pores are only average interchain displacements (D) between macromolecules. This point is of importance because it must be realized that there is no necessary connection, inherency, between polymers and solutions which are useful for the preparation of the two types of membrane. Thus a list of weak nonsolvents which may prove useful in the preparation of polysulfone (PS) membranes for UF may coincidentally contain one or more nonsolvents which may also prove useful in the preparation of PS membranes for gas separations. In the case of Tsugaya, et al., a list of nonsolvents is given, most of which are unsuitable for use in the preparation of gas separation membranes. However, by coincidence, two nonsolvents, acetic and propionic acids, are listed which are useful in the preparation of gas separation membranes. The great majority of the weak nonsolvents listed in Tsugaya, et al., result in membranes which do not have the potential for efficient separation of gases. Fundamental differences exist between gas separation and UF membranes and are as follows:

(1) Gas separation membranes having graded density skins have the potential for intrinsic $\alpha$s. This potential is realized when the membranes are coated with a highly permeable polymer such as a silicone. This potential is absent in the UF membranes because the latter contain large pores which cannot be sealed.

Figure 2:
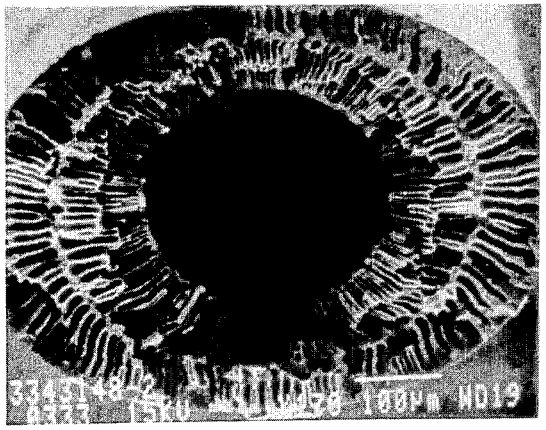
FIGS. 2, 7 and 9 present various prior art membranes. Prior art

(2) Gas separation membranes are strong and macrovoid-free with low water permeability; while UF membranes are fragile and macrovoid-ridden with high water permeability (FIG. 2).

(3) There are also differences between the coagulation (g) values of the sols from which the respective membranes are made. Graded density skinned membranes have g values $< \sim 2$ (optimally $<1.5$). The UF sols of Tsugaya et al have g values $>3$ (optimally $3<g<7$). Graded density skin membrane sols have high percent total solids for sulfone polymers, for example, $> \sim 32\%$ TS and high viscosity $> \sim 50,000$ cps @ 70° C. (optimally $> 10^5$ cps @ 70° C.) whereas Tsugaya, et al., cite only sols with total solids $\leq 17\%$ and viscosities $\sim 2000$ cps @ 23° C. Although Tsugaya, et al., claim sols with total solids $5\% < TS < 40\%$, sols with concentrations substantially $<$ those cited ($\sim 17\%$) will yield membranes with low permeability which are useless for UF. Likewise the concentrations of weak nonsolvents cited in Tsugaya, et al., are much lower than those cited for the graded density skinned process. In fact, Tsugaya et al explicity exclude sols with g values $<2$ (polysulfone) and $<1.5$ (polyethersulfone). Although one example (#12 Table 2) of Tsugaya et al indicates a g value of 1.7 for polysulfone, this value is actually 3.1 based on reproduction of the teachings of example 12. Several other examples of Tsugaya et al were also reproduced and found to be correct. The principal point, however, is not the g value per se which is after all "a working figures", but rather the fact that low viscosity UF sols require a higher g value in order to allow time for some densification prior to gelation to increase the strength of what would otherwise be a friable gel whereas the high viscosity gas separation sols require immediate gelation to avoid densification. Thus, the requirements for g values are opposed to one another for UF and gas separation sols. Low g values are precisely those which are of critical importance with respect to the preparation of gas separation membranes with the potential for intrinsic $\alpha$. Likewise some of the nonsolvents cited by Tsugaya, et al., are too volatile (methyl and ethyl formates), too insoluble in either the organic solvent or water (benzoic and trimellitic acids) to be useful in the preparation of optionally useful gas separation membranes. Two of the "nonsolvents" listed, trimethyl phosphate and triethyl phosphate are actually solvents for polysulfone.

MODERN ERA OF MEMBRANOLOGY

A good general reference for membrane technology which is incorporated herein by reference is *Synthetic Polymeric Membrane, A Structural Perspective*, 2nd Edition, Wiley-Interscience, 1985 by R. E. Kesting. Since the beginning of the modern era of membranology starting about 1960, a primary concern has been the necessity for decoupling permeability (P) from selectivity, i.e., separation factor ($\alpha$). P and $\alpha$ for dense films of a given polymer and in another aspect for asymmetric films of a given polymer are usually considered coupled, that is, if P is specified, $\alpha$ is determined and vice versa. This concept, at first consideration, suggests that dense films for example of glassy polymers possess "intrinsic" Ps and $\alpha$s. However, since the glassy state is a non-equilibrium condition, any intrinsic value will be strongly dependent on sample history so that the concept loses significance except within narrowly defined limits.

In the sections which will follow, both the product, the graded density skinned membranes, and a process for preparing same, including the natures of the sols which exist prior to gelation are described. Hereinafter, the graded density skinned membrane and processes for preparing the membrane can be referred to as "P1". The nature of the former: high separation efficiencies, high free volumes, and skins of graded density are amenable to direct, even though difficult to measure, measurements which can be interpreted with a higher degree of confidence than those of the latter and which have been deduced from polymer solution theory. However, although the interpretations which follow are plausible and even probable, due to the complicated systems and sciences involved which we are concerned with here, it is impossible to exclude every alternative explanation. The interpretations given here are to teach the inventive findings in a reasonable and logical manner.

DETAILED DESCRIPTION OF THE INVENTION

Figure 1:
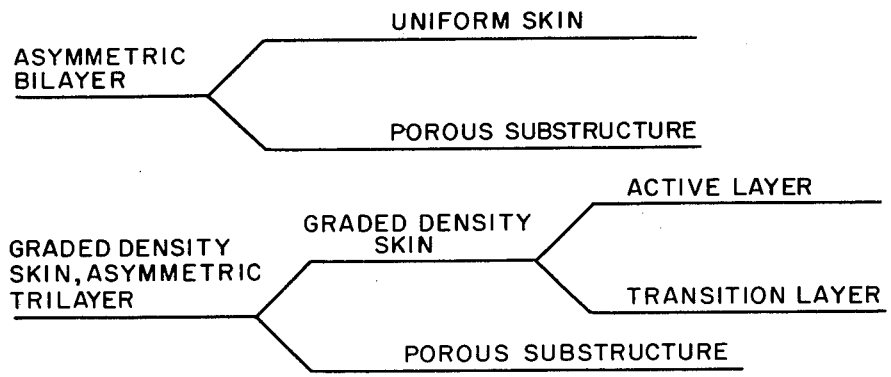
FIG. 1 is a schematic representation of asymmetric membranes according to the prior art and the graded density skinned, asymmetric, macrovoid-free gas separating membrane according to the invention.

A new class of integrally-skinned, asymmetric gas separation membranes has been developed. These new asymmetric membranes which have graded density skins can be considered as trilayered membranes wherein the membranes offer significantly higher permeabilities with constant or improved selectivity as compared to the bilayer asymmetric membranes taught by the art, for example, Henis et al. A bilayer is comprised of a porous substructure and a thin skin of uniform density. A graded density skin membrane possesses a porous substructure and a non-uniform, graded density skin which itself consists of a very thin dense active or separating layer whose effective thickness varies depending upon the gas to be separated and a thin, less dense, but still essentially non-porous transition layer. This analogy is illustrated in FIG. 1 which presents a schematic representation of bilayer asymmetric and trilayer asymmetric graded density sking membranes. Trilayer structure can be obtained by controlling the kinetics of gelation and desolvation through the use of a solvent system containing an equilibrium concentration of a Lewis acid and a Lewis base and a Lewis acid:base complex. The solvent system is capable of dissolving high concentrations of polymer and the complex is readily disassociated by polar medium. The resultant trilayer, although less dense than a standard bilayer, asymmetric membrane, is nevertheless sufficiently fine and uniform that it exhibits the potential of attaining intrinsic selectivity which is realized when any defects have been sealed with a highly permeable material such as silicone.

In the case of dense films such as skins of integrally-skinned membranes, gas molecules permeate by diffusion between polymer chains. The volume occupied by these gaps is known as free volume ($V_f$). The greater the free volume, the more rapidly gas molecules diffuse through the membrane, hence the higher the permeability (P). Free volume is thus a measure of the looseness of packing of the macro molecules. The $V_f$ fraction of a glassy polymer is ~0.025 at the $T_g$ as determined by S. Matsuoka, *Polymer Engineering and Science,* 21 (4), 907 (1981). In other words, only about 1/40 of the total volume of a typical dense glassy polymer consists of free volume. However, free volume is not limited to a precisely fixed or intrinsic value since the glassy state is a non-equilibrium condition. Therefore, since P is related to free volume, P is also variable. It follows that there is no intrinsic P for a given glassy polymer except within narrowly defined limits.

The glassy state can be approached either by cooling a melt or a rubber or by gelling a sol. Kinetic factors influence the magnitude of free volume. As a melt or rubber cools or a sol gels, viscosity increases until it reaches a value of ~$10^{15}$ cps at the $T_g$. Theoretically at a value of 51.6° C. below the $T_g$, the viscosity becomes infinite and free volume is fixed at whatever value is obtained at that point. The faster the glassy state is attained, the less time the macromolecules have for rearrangement and densification and the higher will be the free volume. Quantitative determinations of free volume are accessible with difficulty since free volume is such a small fraction of the total volume of a glassy polymer. Precise density measurements to discern the small differences between large numbers are difficult to obtain. Fortunately, differential scanning calorimetry (DSC) represents a straightforward method of ranking membrane free volumes since $T_g$ increases with increasing free volume (S. Matsuoka). Because gelation and desolvation of the entire fiber takes place rapidly, it is assumed that the $T_g$ of the fiber as a whole is essentially equivalent to the $T_g$ of the skin. It should be realized that both the high free volume and the telltale high $T_g$ will only be present for the first heat excursion of a high free volume glass through the $T_g$ as correlated by Matsuoka. After such a glass has passed through the $T_g$ and cooled, some of its free volume will have vanished. If reheated, it will attain only lower $T_g$ values characteristic of bulk polymers.

Until the present invention, only two options were available to increase the free volume in a given hydrophobic glassy polymer utilized for gas separations. First, membrane density can be decreased and free volume increased through swelling the film or membrane by exposure to $CO_2$ under pressure. Carbon dioxide under pressure acts as a swelling agent and at very high pressure, it can even act as a supercritical liquid solvent, thus the $CO_2$ lessens polymer-to-polymer interaction allowing the macromolecules to move farther apart from one another. For example, Erb and Paul, *J. Membrane Sci.,* 8, 11 (1981) illustrated that the $CO_2$ absorption of melt extruded polysulfone film is increased by exposure to $CO_2$ to 60 atm. Although not explicitly stated by Erb et al, increased $CO_2$ absorption was due to increased free volume. Secondly, the polymer can be modified so as to inhibit close packing. Chern et al., *Materials Science of Synthetic Membranes,* ACS Symposium Series 269, D. Lloyd, ed. 1985: p. 40, showed that whereas films prepared from polysulfone which utilizes bisphenol A exhibits a P for $CO_2$ of 4.4 and an $\alpha$ for $CO_2/CH_4$ of 28, films prepared from polysulfone made with tetramethyl bisphenol A have a P for $CO_2$ of 21 with an $\alpha$ for $CO_2/CH_4$ of 68. The methyl groups in the latter polymer sterically inhibit a close approach between neighboring chains thereby increasing free volume and permeability.

Although both of the above approaches have been successfully applied to thick dense films, the practicality of their application to integrally-skinned membranes is uncertain. For example, $CO_2$ might densify the porous matrix of a skinned membrane, thereby adding to overall resistance by increasing effective skin thickness or by densifying the entire porous substructure. On the other hand, polymer modification as in the second approach is an expensive proposition and can be accompanied by losses of physical properties. Nevertheless, this latter approach has been the one most favored by other researchers as opposed to the present invention wherein the morphology of a specific polymeric membrane is modified through, for example, Lewis acid: base complex solvent, dope formulation which provides changed morphology, i.e., graded density skinned, asymmetric membranes upon gelation in a polar medium.

Until now, however, attempts to increase permeability while maintaining skin integrity in asymmetric or integrally-skinned membranes of glassy, hydrophobic polymers, for example, aromatic sulfone polymers have been unsuccessful. Because glassy, hydrophobic polymers, the class most suitable for gas separation membranes, have much stronger polymer-polymer interaction than polymer-water interaction, it is difficult to control densification when sols of such polymers are gelled in water. This leads to integrally-skinned membranes whose skins have relatively low free volumes and hence low permeabilities. To retard this shrinkage and thereby to retain higher permeabilities, Cabasso et al, *J. Appl. Polym. Sci.,* 20, 2377, (1986); 21, 165 (1977), immersed water-gelled polysulfone, ultrafiltration membranes in concentrated sulfuric acid. Tweddle et al, *Ind. Eng. Chem.,* Prod. Res. Dev., 22 320 (1983) carried this approach a step further and gelled NMP solutions of polysulfone in 25% aqueous sulfuric acid. Because the acid neutralized the basic solvent, NMP, shrinkage was retarded and increased permeability was obtained. We realized that the interaction between sulfuric acid and the weakly basic solvent NMP would greatly decrease the solvent power of NMP. This would minimize the capacity of residual solvent for affecting plasticization and densification and could account for the increased permeability. To determine sulfuric acid interaction with NMP, the two were mixed in a 1:1 molar ratio. A large exotherm suggested the formation of a strong complex. The complex was light colored and appeared to be stable when kept in a closed bottle for several months. However, polysulfone was insoluble in the 1/1 molar mixture of sulfuric acid/NMP. Eventually, a 37% by weight polysulfone sol was prepared in a sulfuric acid/NMP (5/95), the highest tolerable concentration of sulfuric acid in a solvent system. However, fibers spun from this sol exhibited low P/ls and a high residual concentration of NMP/sulfuric acid as illustrated by depressed $T_g$ in Table 7.

Figure 4:
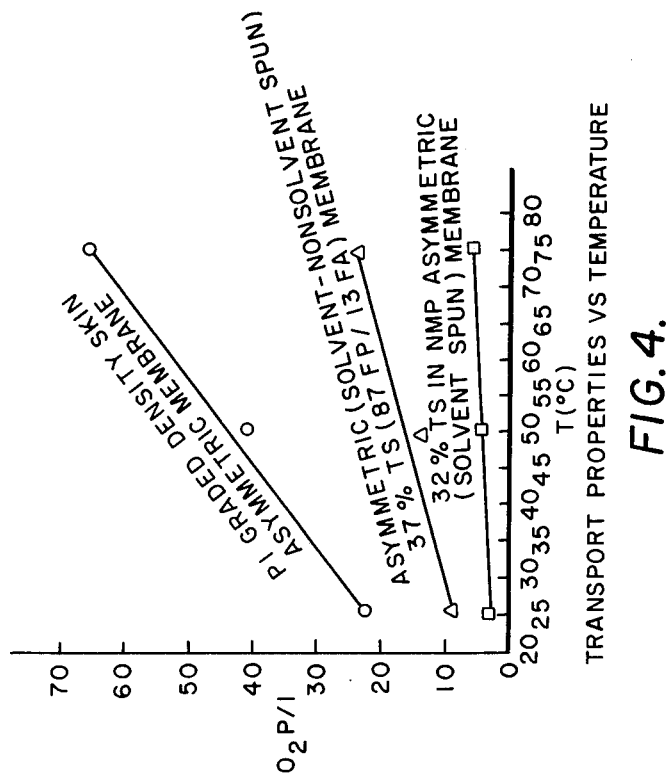
FIG. 4 represents the various performances of art taught membranes, i.e., asymmetric solvent spun and asymmetric solvent/nonsolvent spun gas separation membranes for pure gas, oxygen permeabilities at various temperatures as compared to the performance of the graded density skinned, asymmetric gas separation membranes of the invention.
Figure 3:
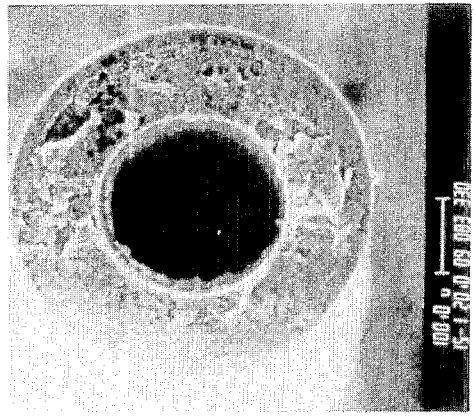
Figure 8:
Figure 7:
Figure 9:
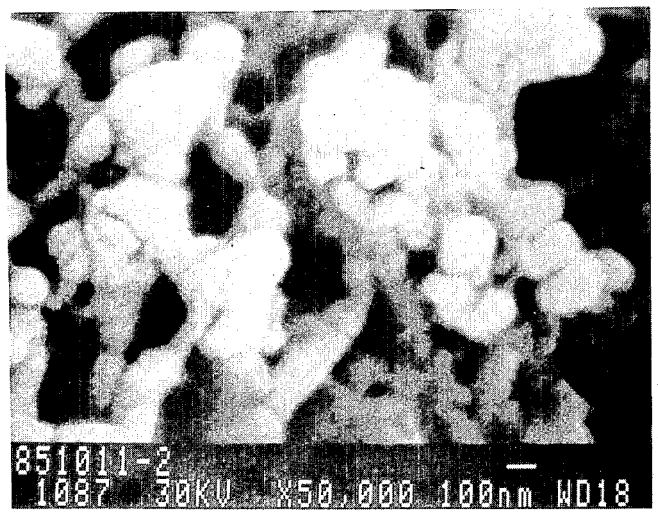
Figure 10:
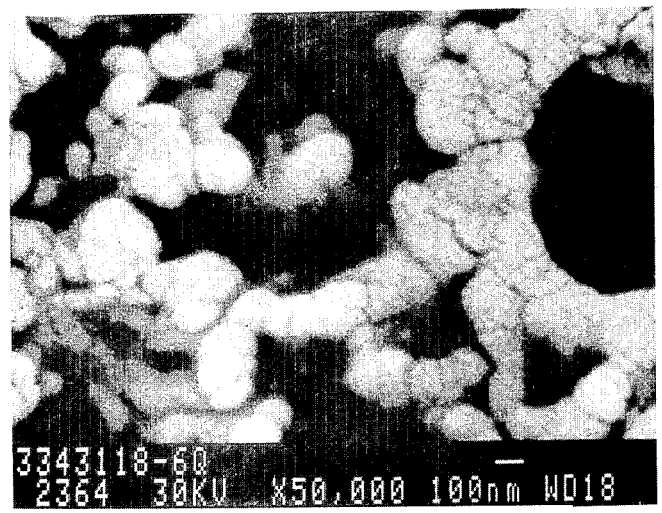

The fact that permeability can be decoupled from separation factor of dense membranes by the preparation of an integrally-skinned membrane was demonstrated for the first time by Loeb and Sourarijan. The high P/l values at essentially intrinsic $\alpha$ in the present invention and as illustrated in FIG. 4 amounts to a second decoupling, this time by modification of the structure of the skin itself. As demonstrated by the elevated first heat $T_g$s of P1 membranes, the origin of the increased permeability is related to the increased free volume morphology in the membrane skin as illustrated in Table 7. Concomitant to the increase in permeability, selectivity is maintained constant, clearly demonstrating the presence of a skin, the structure of which requires further elucidation.

A powerful technique to define the structure of the separation layer and the internal matrix is oxygen plasma ablation. Diatomic oxygen molecules are disassociated into nascent oxygen, a strong oxidizing agent, by a radio frequency generator. At low pressures, these moieties are sufficiently long-lived to react with a variety of polymers reflected by a loss of weight with time. The rate of ablation is dependent upon the chemical structure of the polymer as well as its radio frequency power level and the oxygen flow rate.

The technique is amenable for investigating hollow fiber membrane materials because ablation occurs only on the surface rendering it possible to sequentially remove the outer layers of a hollow fiber membrane; and oxygen plasma ablation is a low temperature process allowing surface etching to proceed without altering the internal structure of the system.

Experiments were run on test cells of polysulfone spun from a 1:1 propionic acid/NMP complex with 37% by weight total solid dope and from an 87/13 formyl-piperidine/formamide (FP/FA) 37% total solids (TS) dope in a Low Temperature Asher 600 at 50 watts radio frequency at 0.9 mmHg. After sets of test cells were ablated for increasing intervals of time, the samples were tested for helium and nitrogen permeability at $1.45 \times 10^4$ Pascals (Pa). The helium/nitrogen separation factor plotted versus etch time in minutes is shown in FIG. 5.

FIG. 5 reveals that the 37% (87FP/13FA) polysulfone hollow fiber membrane has a denser, more uniform skin than does the P1 hollow fiber membrane. This is reflected by the higher initial separation factor of the uncoated fiber and the plateau region in approximately the first 30 seconds of etching. The drop in separation factor measured for the FP/FA polysulfone spun material in the 0.5 to 2 minute range indicates a transitional zone from a dense skin to the more porous matrix. The lower separation factors of the P1 hollow fiber membranes indicate the active (separating) layer is both thinner and more porous than the asymmetric polysulfone fiber which does not have a graded density skin. No plateau is seen with the P1 fiber which has the graded density skin. Instead a gradual decrease in separation factor with etching time is observed. This lack of a plateau indicates the existence of a density gradient in the skin of the P1 membrane with skin density decreasing with increasing proximity to the skin/matrix interface. The densest layer of the P1 fiber skin exhibits sufficient fineness and uniformity and contains defects small enough in size and number that it can be said to possess the potential for intrinsic $\alpha$. At the same time the fact that P1 membranes are macrovoid-free contributes to the potential for intrinsic $\alpha$. Macrovoid-containing membranes do not possess the potential for intrinsic $\alpha$. This potential is realized after the defects have been sealed by coating with a highly permeable silicone polymer. Low residual solvent, as determined by gas chromatography and first heat $T_g$ measurements, is essential to the maintenance of high free volume and to the characteristic of permeability low creep.

A major factor throughout the development of the P1 membranes has been the importance of acid:base, hydrogen bonded complexes in solvent mixtures employed in the dopes. In concert with studies on glassy-state structure and spinning technique development, a study has also focused on the nature and extent of complex formation processes in the solvent mixtures themselves. Such studies included various spectroscopic and thermochemical probes aimed in part at distinguishing the more promising P1 type solvent systems from more traditional solvent/nonsolvent systems. Clearly, complexes of the Lewis acid and Lewis base of the appropriate strength and in sufficient concentration are important. Also important are solvency characteristics relative to the given polymer. Neither of these physical elements alone is sufficient to yield optimum membrane transport properties as found in P1. For example, solvent mixtures containing formamide with basic solvents such as NMP and FP which represent certain stages of the prior art in terms of their solvency characteristics do in fact form very weak complexes. However, the weakest complexes do not form a P1 type membrane from the coagulation spinning processes. Clearly then, the combined effect of complex strength and its solvency characteristics is dominant in this present invention.

Phase invention essentially involves the structuring of a sol with the desired degree of swelling and order and the subsequent immobilization of the sol into a gel with a corresponding degree of swelling and order. In the present instance of high viscosity ($> \sim 30\%$) total solids sol with low ($<2$) g values, there is a very close correspondence between sol structure that exists immediately prior to, and the gel structure which exists immediately following, gelation. Gelation and desolvation take place very rapidly which helps to avoid sol inhomogeneities that lead to macrovoids thus minimizing densification owing to plasticization and allows skin density gradients to arise and to be maintained. Since the gel structures for this invention exhibit the potential for intrinsic $\alpha$s, it can be deduced that the sols are extremely fine and uniform so that the resultant gels also exhibit these traits, together with a minimum number of small and, therefore, sealable defects. The problem hence resolves itself into the origin of fineness and uniformity of the sol state. This is the point where deductions based on polymer solution theory come into play. A number of empirically established principles must be considered.

The stronger the polymer-solvent interaction and conversely the weaker the polymer-polymer interaction, the finer and more uniform will be the dispersion of macromolecules or aggregates of macromolecules in a given sol.

Sols based solely on polymer and solvent generally gel and desolvate too slowly to produce membranes with the potential for efficient separations such as, for example, the graded density skin membranes according to the invention. In addition, local redissolution may occur with catastrophic consequences for gel uniformity.

The addition of nonsolvent poreformers to the sol decreases gel density which lessens the resistance to gas permeation of the resultant gels.

The stronger the nonsolvent (NS), that is, the greater difference ($\Delta$) between $\delta_{NS}$ and the $\delta_{polymer}$, the greater the coarseness and local nonuniformity within the sol. This trend is transferred to the gel and if $\Delta$ is of sufficient magnitude can lead to the failure to achieve the potential for intrinsic $\alpha$. Although this tendency can be accommodated by minimization of nonsolvent concentration so that the $\Delta$ between the $\delta_{solvent\ system}$ and the $\delta_{polymer}$, can be maintained within specified limits, this results in minimal sol swelling and, therefore, high gel density. Furthermore, the limit of compatibility of strong nonsolvents in a sol is usually too low to permit an appreciable degree of sol swelling in the first place.

A strong nonsolvent is defined as one having a $\Delta$ ($\delta_{nonsolvent}-\delta_{polymer}$) $> \sim \pm 6$ cal$^{\frac{1}{2}}$/cm$^{3/2}$. In practice, allowable $\Delta$s will only be positive since NS with such a strong negative $\Delta$ will not be water miscible, a prerequisite for a wet process. For this reason the concentrations of strong nonsolvents such as H$_2$O ($\delta$ 24), formamide ($\delta$ 19) or glycerol ($\delta$ 18) usually cannot exceed 15-20% of the solvent system (Table 3). In comparison to the low tolerance of polymer solutions for strong nonsolvents, higher concentrations of weak nonsolvents can be incorporated. A weak nonsolvent is defined as one with a $\Delta < \sim \pm 6$ cal$^{\frac{1}{2}}$/cm$^{3/2}$. In this case also allowable $\Delta$s tend to be positive. The potential for low density (high permeability) gels increases when high concentrations of weak nonsolvent are utilized in the sols. However, as the $\Delta$ decreases, the nonsolvent, particularly at elevated temperatures, may assume the role of a swelling agent with adverse effects on the rates of gelation and densification. Thus the choice of the proper weak nonsolvent becomes a tradeoff between the use of nonsolvents which promote sol fineness and uniformity at the low $\Delta$ end and those which promote coarseness and rapid gelation and desolvation at the high $\Delta$ end.

Insofar as optimum gas separation membranes are concerned we have determined empirically that the potential for high permeability (low skin density) and high selectivity (macrovoid-free matrices and graded density skins with relatively small sealable defects) is not simply a matter of choosing a nonsolvent with the appropriate $\Delta$. A preferred process for forming the P1 membranes according to the invention utilizes a solvent system which contains a high concentration of Lewis acid:base complex (Table 3).

The formation of Lewis acid:base complexes can be written:

$$A + B \rightleftarrows A:B$$

where A is the Lewis acid, B the Lewis base, and A:B is the complex. Most commonly B is a solvent and A is a nonsolvent, for example, N-methyl pyrrolidone (NMP) is a solvent for polysulfone (PS) and propionic acid (PA) is a nonsolvent. However this is not universally true since A and B can both be solvents as, for example, when A is 2-chloropropionic acid and B is NMP.

The efficiency of a membrane gel appears to bear a relationship to the compatibility of the polymer in the solvent system (SS) provided the solvent system contains a high concentration of A:B complex (Table 3). Here compatibility is considered proportional to $\Delta^{-1}$ where $\Delta = |\delta_{SS} - \delta_{polymer}|$. In this instance the polymer is PS ($\delta$ 10.55). The highest efficiencies are obtained when the $\Delta \leq \sim 1.3$ cal$^{\frac{1}{2}}$/cm$^{3/2}$ and poor efficiencies are obtained for $\Delta > \sim 1.5$. The utilization of solvent systems which do not form strong A:B complexes results in less efficient membranes even when the $\Delta$ is such as to indicate a high degree of compatibility (Table 2).

It is hypothesized that this difference between the efficacy of sols which contain A:B complexes and those which contain solvents and nonsolvents which form only weak complexes or no complexes lies in the greater uniformity on the molecular level of the former. The A:B complexes exist in equilibrium with A and B and possibly act to compatibilize free A and B in much the same manner as a graft copolymer of polymer A and polymer B acts to compatibilize a mixture of polymers A and B. In the absence of strong interactions between nonsolvent and solvent, weak thermally labile complexes may form or perhaps oligomeric clusters of nonsolvents may persist which may lead to sol nonuniformity and ultimately to gel nonuniformity. The existence of weak complexes and/or nonsolvent clustering may have the effect of leaving solvent molecules freer to engage in polymersolvent interaction with adverse effects on the rates of gelation and desolvation. According to this point of view the role of the A:B complex is to maximize sol compatibility and uniformity at the molecular level without at the same time permitting an increase in polymer-solvent interaction.

The properties of the A:B complexes will now be considered. The ranking of the strengths of Lewis acids and bases has been affected by V. Gutmann, et al., *Monats Chem.*, 106 1235 (1975) and 99 335 (1968) in his acceptor number (AN) and donor number or donicity (DN) series, respectively (Tables 4 and 5). Both of these lists have been augmented for the present study. The strength of A:B complexes was also estimated from the magnitude of the IR frequency shifts of the C=O bands of amides or in the case of DMSO and TEP of the shifts of the S=O and P=O bands, respectively (Table 6, FIG. 6).

Acids which yield useful complexes appear to fall in the range $\sim 47 < AN < \sim 53$ with 2-chloropropionic acid (AN 62.4) being an outlyer of marginal interest. However not every Lewis acid in this range forms a useful complex. Glycerol, for example, although exhibiting an AN of 49.4 has only a modest $\Delta \nu$ of $\sim 15$ cm$^{-1}$ whereas useful acids have a $\Delta \nu$ of $\sim -25$ to $-38$ cm$^{-1}$ (Table 6). All useful acids to date are not only Lewis acids (electron pair acceptors) but also Brønsted-Lowry acids (proton donors) (Table 7). However, even in this category many ineffective species are encountered. Too strong an acid such as $H_2SO_4$ yields an A:B complex which is not only poorly compatible, but which will not readily diassociate in water and hence will be retained by the membrane. Inadequate water solubility (benzoic and glutaric acids) results in inefficient removal and hence in poor membrane and performance. To date the only acceptable acids which have been found have $12 < \delta < 13.5$ optimally $12 < \delta < 12.5$. Of these propionic- and butyric->acetic acid are preferred and for aesthetic reasons propionic acid is the best overall choice.

The Lewis bases which ultimately result in efficient gas separation membranes appear to have $27 < DN < 28$ and $11 < \delta < 12$ which makes the $\Delta s$ ($\delta_{SS} - \delta_{polymer}$) $< \sim 1.5$ cal$^{\frac{1}{2}}$/cm$^{3/2}$ (Table 3). This group includes the amide solvents NMP, DMAC, FP, (N-methyl piperidone, N-methyl caprolactam). The species in parentheses are not commercially available, but because of their close relationship to NMP, it is felt that they would also be acceptable bases. The $\delta s$ for the aromatic sulfone polymers are taken as: Udel® polysulfone (10.55), Radel® polyphenylsulfone ($\sim 11$) and Victrex® polyethersulfone ($\sim 11.5$).

The kinetics of gelation and desolvation are an important practical consideration in the design of a particular sol for use in the P1 process. This is true because the amount of free volume retained depends on how rapidly the sol viscosity reaches infinity (gelation) and how rapdily the solvent is removed from the gel, thus minimizing post gelation densification. The closer the sol is to the thermodynamic point of incipient gelation (PIG), the more rapidly it will gel and the higher will be the retained free volume. The PIG is a function of temperature and at any given temperature of the residual solvent power, a measure for which is non-solvent tolerance. Because it is difficult to titrate the nonsolvent tolerance of a highly viscous sol, a dilute solution of polymer in a given solvent is employed instead. A convenient test for proximity to PIG is the coagulation value (g) which is defined as the grams of water which when added to 100 g of a 2% solution of the polymer at 30° C. will promote phase separation (turbidity). For UF membranes where low total solids (TS) are utilized, low viscosity and the resultant macrovoids are permissible, a g optimally between 3 and 7, is preferred. This is the case because in low TS sols, gelation is deliberately retarded so as to allow densification and strengthening of what would otherwise be an extremely fragile gel. However retarded gelation and low viscosity lead to sol inhomogeneities which in turn lead to the formation of macrovoids. For gas separation membranes, however, where the presence of macrovoids is detrimental, g values $< 2$ in the case of PS in PA:NMP are preferred (optimally $0 < g < 1.5$). A lower g is required for gas separation membranes than for UF membranes because gelation must be extremely rapid to prevent the formation of the sol inhomogeneities which can lead to the formation of macrovoids and subsequent unsealable surface defects. For the same reason, sol viscosity and total solids must be higher for gas separation membranes. All of these interrelated parameters act to minimize the formation of sol inhomogeneities and macrovoids.

The fact that a high A:B molar ratio and consequently a low nonsolvent tolerance (=low g value) must be present to ensure optimum results for gas separation membranes can be seen from Table 8. For the case of PS sols in PA:NMP the rest results, i.e., highest $O_2P/ls$ plus highest $\alpha O_2/N_2$ are obtained when the ratio of acid to base lies between approximately 0.75 and 1.1 with g values $< 2$. It should also be noted that reproducibility suffers at lower A:B ratios. This is a result of the higher g values which lead to sol inhomobeneities during the sol gel transition. However, for the case of PS and other polymers in other solvents the optimum value of A:B ratio may be lower if the solvent power of the A:B complex is insufficient to permit the preparation of high TS sols. Sols with g values $< 2$ were expressly excluded from earlier claims for sols which were useful for the preparation of UF membranes. This is further evidence that there is no inherency between nonsolvents for sols which are useful for UF membranes and those which are useful for gas separation membranes.

The reinforcing roles of viscosity, TS, and high PA/NMP ratio to eliminate macrovoids are shown in Table 9. In an earlier disclosure aimed at producing UF membranes a 17% TS PA/NMP molar raio 0.44 was used to prepare macrovoid-containing UF membranes. This same sol was spun and resulted in high population macrovoid-containing fibers which were completely unsuitable for gas separations. At this PA/NMP ratio even when the TS are increased to 32% and even 37%, $\alpha$ remains low. It follows that high TS, high viscosity and a high PA/NMP A:B ratio are all required to produce macrovoid-free PS fibers which are suitable for gas separations. The g value (nonsolvent tolerance) for a PA:NMP A:B ratio of 0.44 is 4.4 which is considerably greater than the optimum $0.5 < g < 1.5$ for gas separation membranes. Table 9 thus adds further support to the irrelevancy to gas separation membranes based on conclusions from formulations which have been made regarding UF membranes.

COATING CONSIDERATIONS

The typical structure of the skins of integrally-skinned gas separation membranes prepared by phase inversion process is either similar to that of thick dense films or of dense films with a density gradient. However, the skin of every such membrane contains by virtue of the fact that micellar coalescence is never complete, a small number of defects or surface pores. It has been established empirically that the P1 membrane possesses the potential for intrinsic $\alpha$. In other words, however large or numerous the defects, such defects are adequately sealable by known coating technique (Henis et al).

P1 membranes can be produced from various processes and polymers; however in this work P1 membranes were produced by the Lewis acid:base complex solvent system dopes of aromatic sulfone polymers (Table 11). The first heat $T_g$s of membranes made from sols containing Lewis A:B complexes are substantially higher than those prepared from sols containing noncomplexing nonsolvents. The superiority of the permeation characteristics of P1 type membranes is apparent in each case.

Comparison of transport properties for various gases utilizing P1 coated membranes versus coated Henis et al type membranes are illustrated in Table 11. Two aromatic sulfone polymers (polysulfone and polyethersulfone) were tested for various gas permeabilities in the P1 and non-P1 form. Table 11 is not complete in every comparison since some data was not available under comparable test conditions.

EXPERIMENTAL DETAILS

Fiber Spinning

All of the hollow fibers recorded in the following tables were spun by a standard wet spinning process. Deaerated sol (dope) was delivered at a rate of up to 20 ml/min to a tube-in-orifice type spinnerette. The spinnerette was maintained at a temperature between 15°–100° C. by the application of sufficient heat to maintain adequate sol flow. Water was injected into the fiber lumen at a rate of up to 10 ml/min to form the nascent hollow fiber which was drawn at a rate of up to 100 m/min. The fiber is drawn through water baths maintained at temperatures of up to ambient and above, but less than about 50° C. The hollow fiber is then washed with water. The fiber is then wound onto a bobbin and washed for up to 7 days in running water. Hanks of hollow fibers are then formed by skeining the fiber from the bobbin. These hanks are then hung vertically and dried rapidly at about 100° C.

Hollow Fiber Permeability Testing

Except where otherwise noted the permeability and selectivity values were obtained from 1"×1' elements each containing ~1200 hollow fibers. The separators were coated from a 1% Sylgard solution in isopentane. Coated separators were then placed in a pressure vessel, and the oxygen and nitrogen flux rates were measured at 50° C. under $2.9 \times 10^4$ Pa using a dry tank ar feed. Permeability was calculated using equation (1)

$$P/l = \frac{Q \times C.F.(14.7 \text{ psi/atm})}{n\pi \, dt\Delta P(76 \text{ cmHg/atm})(60 \text{ sec/min})}$$

where Q=the apparent gas flow reading from the mass flow meter (cm³(STD)/min); CF=a conversion factor for the specific gas to change the apparent flux to the actual flux; n=the number of fibers; d=the outer diameter of the fiber (cm); t=active fiber length; P=the permeability of the skin layer; and l=the thickness of the effective layer.

DSC-First Heat $T_g$

Duplicate samples were tested on a DuPont 1090 DSC at a 20° C./min heating rate through and beyond the $T_g$ to 250° C. After the first heat, the samples were cooled and subsequently reheated. Precision of the measurements is at least ±1° C.

Residual Solvent

Selected samples were evaluated as to residual solvent on a Perkin Elmer Sigma 115 Gas Chromatograph. Fiber samples dissolved in $CH_2Cl_2$ are compared to calibration standards containing known amounts of the solvents being assayed.

$O_2$ Plasma Etching

Test cells were prepared from hollow fiber membranes spun from 37% total solids Udel 3500 PS in 43 propionic acid:57 NMP (%W/W) and 13 formamide/87 formylpiperidine (%W/W). Each cell contained ten hollow fibers approximately 15 cm in length. The test cells were divided into two sets. The first set contained sixteen test cells of each type of hollow fiber. Duplicate samples of each type were placed in a Tracerlab Low Temperature Asher cell for exposure to an oxygen plasma for 0.5, 1.0, 1.5, 2.0, 3.0, 5.0 or 10.0 min. Duplicate samples of each type remained unexposed controls. The plasma was maintained with a radio frequency of 13.6 megaherz at a power level of 50 watts. The oxygen flow rate was 20 sccm. These samples were measured for their uncoated helium and nitrogen permeabilities at $1.45 \times 10^4$ Pa at room temperature.

Infrared Spectra of Solvent Systems

IR spectra of pure and mixed solvents were recorded at ambient temperature on a Nicolet MX-1 Fourier Transform Spectrometer. Sample liquids were examined as the capillary films pressed between the surfaces of calcium fluoride optical flats and in some cases as dilute solutions in cyclohexane using 0.1 mm fixed path length cell with $CaF_2$ windows. Samples were examined under $N_2$ gas atmosphere, corrected for any residual atmospheric $CO_2$ absorptions, and analyzed digitally using Nicolet DX-1 software programs. Resolution was better than 2 cm$^{-1}$.

Acceptor Number (AN) Values

Using experimental procedures analogous to those of Gutmann, U. Mayer, V. Gutmann and W. Gerger, *Monats. Chemie,* 106, 1235 (1975), AN values were determined from $P^{31}$ NMR measurements of $(C_2H_5)_3PO$ dissolved at low concentrations in various compounds. Spectra were recorded on a Varian Instruments XL-200 Fourier Transform NMR Spectrometer, operating at 81 MHz for detection of phosphorus −31. Broad band proton decoupling was used to collapse the $P^{31}$ multiplet signal of $(C_2H_5)_3PO$ to a single peak, whose spectral position reflects the degree of interaction between $(C_2H_5)_3PO$ and a given sample compound. Peak positions were corrected for differences in bulk diamagnetic susceptibility between solvents and were reproducible to better than 0.1 ppm.

Donor Number (DN) Values

Using experimental procedures analogous to those of Gutmann, V. Gutmann and A. Scherhaufer, *Monats. Chemie,* 99, 335 (1968), DN values were determined calorimetrically from the exothermic enthalpy ($-\Delta H$) of interaction between sample and antimony pentachloride, in dilute solution in 1,2-dichloroethane at 25° C. Measurements were run on a Setaram Model C80 Heat Flux Calorimeter, using a two compartment mercury sealed cell. Thermal data were analyzed using Astra Scientific software programs for digital integration of the heat flux signals.

TABLE 1

Selected Sol and Gel Properties of Fibers Spun From 32% TS Udel ® 3500 Polysulfone in Neat Solvents

| Solvent | Dope Viscosity (cps @ 30° C.) | Presence of Macro-voids (Yes/No) | $O_2$ P/l × $10^6$ | $O_2$ $\alpha_{N_2}$ |
|---|---|---|---|---|
| 2 chloropropionic (2CP)* acid | ~750,000 | No | 21.0 | 4.4 |
| triethylphosphate (TEP) | 346,000 | No | 26.1 | 3.3 |
| formylpiperidine (FP) | 201,750 | Yes | 10.2 | 2.1 |
| N—methyl pyrrolidone (NMP) | 44,000 | Yes | 4.4 | 3.0 |
| dimethyl formamide (DMF) | 23,650 | Yes | 4.3 | 2.9 |
| dimethyl acetamide | 17,300 | Yes | 9.4 | 3.5 |

TABLE 1-continued

Selected Sol and Gel Properties of Fibers Spun
From 32% TS Udel ® 3500 Polysulfone in Neat Solvents

| Solvent | Dope Viscosity (cps @ 30° C.) | Presence of Macro-voids (Yes/No) | $O_2$ P/l × $10^6$ | $O_2 \alpha_{N_2}$ |
|---|---|---|---|---|
| (DMAC) | | | | |

*2CP self-complexes via hydrogen bonding, as is typical of various carboxylic acids, and as such may be capable of producing a PI-type membrane.

TABLE 2

Hildebrand Solubility Parameters Δs and Δν (C=O)s of
Non- or Weak-Complex-Forming Vehicles in 37% Polysulfone Sols

| Vehicle | Vehicle (% w/w) | $\delta_v^*$ (cal$^{\frac{1}{2}}$cm$^{-3/2}$) | $\Delta^{**}$ (cal$^{\frac{1}{2}}$cm$^{-3/2}$) | $O_2$P/l (× $10^6$) | $O_2 \alpha_{N_2}$ | Δν (C=O) (cm$^{-1}$) |
|---|---|---|---|---|---|---|
| formamide/NMP | 17/83 | 12.13 | 1.58 | 8.3 | 4.7 | ~ −5 |
| formamide/FP | 13/87 | 12.94 | 2.39 | 10 | 5.2 | ~ −5 |
| glycerol/NMP | 15/85 | 11.52 | 1.07 | 4.7 | 5.0 | −12 to −16 |
| ethyl lactate/NMP | 43/57 | 10.53 | 0.02 | 46.8 | 4.1 | −5 |
| N—methyl formamide/NMP | 43/57 | 13.34 | 2.79 | 20 | 3.9 | −5 to −13 |
| N—methyl acetamide/NMP | 43/57 | 13.05 | 2.50 | 9.9 | 5.2 | −5 to −13 |
| triethyl phosphate***/NMP | 72/28 | 10.64 | 0.09 | 57.2 | 3.9 | 0 |
| ethylene carbonate/NMP | 48/52 | 10.55 | 0.00 | 4.0 | 2.4 | 0 |

*$\delta_v = \delta_{vehicle}$
**$\Delta = \delta_{vehicle} - \delta_{polymer}$ ($\delta_{Udel\ PS} = 10.55$)

TABLE 3

Hildebrand Solubility Parameters and Δs of Vehicles for 37% Polysulfone
Sols Containing A:B Complexes Versus Air Separation Characteristics

| Complex | DN | A:B$^1$ (% W/W) | $\delta_{ss}^*$ (cal$^{\frac{1}{2}}$/cm$^{3/2}$) | $\Delta^{**}$ (cal$^{\frac{1}{2}}$/cm$^{3/2}$) | $O_2$ P/l (× $10^6$) | $O_2 \alpha_{N_2}$ |
|---|---|---|---|---|---|---|
| PA:DMAC | 27.8 | 30/70 | 11.09 | 0.54 | 29.6 | 4.8 |
| PA:NMP | 27.3 | 43/57 | 11.83 | 1.28 | 43 | 5–5.2 |
| AA:NMP | 27.3 | 38/62 | 11.65 | 1.10 | 16.2 | 4.9 |
| PA:FP | 27.0 | 38/62 | 11.75 | 1.20 | 24.7 | 5.2 |
| PA:DMSO | 29.8 | 7/93 | 12.17 | 1.62 | 9.0 | 5.2 |
| PA:DMF | 26.6 | 25/75 | 12.04 | 1.49 | 26.2 | 3.7 |

$^1$PA = propionic acid; AA = acetic acid
*$\delta_v = \delta_{vehicle}$
**$\Delta = \delta_{vehicle} - \delta_{polymer}$ ($\delta_{Udel\ PS} = 10.55$)

TABLE 4

GUTMANN ACCEPTOR NUMBERS (AN)

| Compound | AN[a,b] |
|---|---|
| $H_2SO_4$ | 130.1[M] |
| $CF_3SO_3H$ | 129.1[G] |
| $CH_3SO_3H$ | 126.3[G] |
| $CF_3CO_2H$ | 105.3[G] |
| formic acid | 83.6[G] |
| 2-chloro-propionic acid | 62.4[M] |
| lactic acid (85%) | 55.9[M] |
| water | 54.8[M] |
| $CF_3CH_2OH$ | 53.3[G] |
| acetic acid | 52.9[G], 52.6[M] |
| glycerol | 49.4[M] |
| propionic acid | 49.1[M] |
| n-butyric acid | 48.3[M] |
| glutaric acid | 48.2[M] |
| benzoic acid | 47.1[M] |
| iso-butyric acid | 47.0[M] |
| methanol | 41.3[G] |
| formamide | 39.8[G] |
| ethanol | 37.1[G] |
| ethyl lactate | 36.5[M] |
| isopropanol | 33.5[G] |
| N—methyl-formamide | 32.1[G] |
| N—methyl-acetamide | 27.3[M] |
| chloroform | 23.1[G] |
| ethylene carbonate | 22.3[M] |
| dimethyl sulfoxide | 19.3[G] |
| sulfolane | 19.2[G] |
| acetonitrile | 18.9[G] |
| propylene carbonate | 18.3[G] |
| trimethyl phosphate | 16.3[G] |
| dimethyl formamide | 16.0[G] |
| dimethyl acetamide | 13.6[G] |
| N—methyl-2-pyrrolidone | 13.3[G] |
| acetone | 12.5[G] |
| dioxane | 10.8[G] |
| hexamethyl phosphoramide | 10.6[G] |
| tributyl phosphate | 9.9[G] |
| ethyl acetate | 9.3[G] |
| tetrahydrofuran | 8.0[G] |
| hexane | 0.0[G] |

[a] acceptor number AN determined from $P_{31}$ NMR chemical shifts of $(C_2H_5)_3$PO dissolved in the indicated compound, scaled to set AN for hexane at zero and to set AN for antimony pentachloride at 100.
[b] G indicates AN values from V. Gutmann, et al. (1975, Monats. Chemie, 106. p. 1235) or Mayer (1979, Pure and Appl. Chem., 51, p. 1697). M indicates AN values established by experimental measurements using experimental procedures analogous to those of Gutmann.

TABLE 5

GUTMANN DONOR NUMBERS (DN)

| Compound | DN[a, b] | |
|---|---|---|
| triethylamine | 61.0[G] | |
| ammonia | 59.0[G] | |
| hexamethyl phosphoramide | 38.8[G] | |
| pyridine | 33.1[G] | |
| water (liquid) | ~33.[G] | |
| N—formyl-morpholine | 32.6[M] | |
| diethyl acetamide | 32.2[G] | |
| diethyl formamide | 30.9[G] | |
| dimethyl sulfoxide | 29.8[G] | |
| dimethyl acetamide | 27.8[G] | |
| N—methyl-2-pyrrolidone | 27.3[G] | |
| N—methyl-caprolactam | 27.1[G] | |
| N—formyl piperidine | 27.0[R] | |
| dimethyl formamide | 26.6[G] | |
| triethyl phosphate | 25.4[M] | N—methyl acetamide[M,c] ~25 |
| tributyl phosphate | 23.7[G] | |
| trimethyl phosphate | 23.0[G] | N—methyl formamide[M,c] ~23 |
| tetrahydro furan | 20.0[G] | formamide[M,c] ~20 |

TABLE 5-continued

GUTMANN DONOR NUMBERS (DN)

| Compound | DN[a,b] |
|---|---|
| diethyl ether | 19.2[G] |
| methanol | 19.0[G] |
| water (gas) | 18.0[G] |
| ethyl acetate | 17.1[G] |
| acetone | 17.0[G] |
| methyl acetate | 16.5[G] |
| ethylene carbonate | 16.4[G] |
| propylene carbonate | 15.1[G] |
| sulfolane | 14.8[G] |
| dioxane | 14.8[G] |
| acetonitrile | 14.1[G] |
| acetic anhydride | 10.5[G] |
| nitrobenzene | 4.4[G] |
| nitromethane | 2.7[G] |
| benzene | 0.1[G] |
| 1, 2-dichloroethane | 0.0[G] |
| carbon tetrachloride | 0.0[G] |
| hexane | 0.0[G] |

[a]Donor number DN determined from the calorimetric - $\Delta H_{rxn}$ for antimony pentachloride with the indicated compound determined at high dilution in 1, 2-dichloroethane at 25° C.
[b]G indicates DN values from Guttmann, et al. (1968, Monats, Chemie, 99, p. 335) or Mayer (1979, Pure and Appl. Chem., p. 1697). R indicates DN values for 1-formyl-piperidine provided by Reilly Chemical Company. M indicates DN values from Murphy, this work, using experimental procedures analogous to those of Gutmann.
[c]Values estimated from trends (methyl substitutions) in other compounds.

TABLE 6

Infrared Shifts of Lewis Acid:Base Complexes

| Base | Acid | $\Delta \nu$ (C=O)[a] |
|---|---|---|
| NMP | 2-chloro-propionic acid | $-46$ cm$^{-1}$ |
| NMP | benzoic acid | $-40$ |
| NMP | acetic acid | |
| NMP | propionic acid | |
| NMP | butyric acid | $-36$ to $-38$ |
| NMP | iso-butyric acid | |
| NMP | glutaric acid | |
| NMP | lactic acid (85%) | $-20$ |
| NMP | phenol | $-20$ |
| NMP | hexafluoro isopropanol | $-19$ |
| NMP | ethylene glycol, glycerol | $-12$ to $-16$ |
| NMP | ethyl lactate | $-15$ |
| NMP | methanol | $-14$ |
| NMP | isopropanol | $-10$ |
| NMP | water | $-5$ to $-10$ |
| NMP | formamide | |
| NMP | N—methyl-formamide | $-5$ to $-13$ |
| NMP | N—methyl-acetamide | |
| NMP | ethylene carbonate | negligible[d] |
| NMP | propylene carbonate | (0 to $-5$) |
| FP | acetic acid | |
| FP | propionic acid | $-32$ to $-33$ cm$^{-1}$ |
| FP | water | negligible[d] |
| FP | formamide | (0 to $-5$) |
| DMF | acetic acid | |
| DMF | propionic acid | $-25$ to $-26$ |
| DMF | water | $-5$ to $-10$ |
| DMF | formamide | 0 to $-5$ |
| DMAC | propionic acid | $-31$ |
| DEAC | propionic acid | $-35$ |
| DMSO | propionic acid | $-37$[c] |
| TEP | propionic acid | $-68$ to $-80$[c] |
| BLO | acetic acid | |
| BLO | propionic acid | negligible[d] |
| BLO | water | (0 to $-5$) |
| BLO | formamide | |
| ethyl acetate | propionic acid | negligible[d] |
| acetone | propionic acid | (0 to $-5$) |

[a]$\Delta \nu$ is the observed shift of the C=O band of NMP observed in the IR spectra typically of 1:1 molar mixtures of the base NMP with various acids except in case of polyprotic acids, such as glutaric acid, ethylene glycol and glycerol, where 1:1 equivalent mixtures were also examined. Reference point (zero shift) is taken to be the C=O band frequency in the IR spectrum of pure NMP.
[b]$\Delta \nu$ is the shift to lower frequency observed typically in 1:1 molar mixtures of base and acid. For amides (FP, DMF, DMAC and DEAC), the esters (butyrolactone and ethyl acetate) and the ketone (acetone), the base C=O band shift is monitored.
[c]For bases DMSO and TEP, IR band shifts were observed for the S=O and P=O groups, respectively.
[d]Indicates IR spectra of mixture wherein bands appear to be simply super positions of spectral bands characteristic of separate pure components of the mixture.
*The following abbreviations are used throughout:
NMP = N—methyl-2-pyrrolidone
DMF = N,N—dimethylformamide
DMAC = N,N—dimethylacetamide
DEAC = N,N—diethylacetamide
FP = 1,formylpiperidine
TEP = triethylphosphate
BLO = δ-butyrolactone
FA = formamide
PA = propionic acid
DMSO = dimethylsulfoxide
AA = acetic acid
PS = polysulfone
PES = polyethersulfone
PPS = polyphenylsulfone

Hydrogen Bonding Schematic

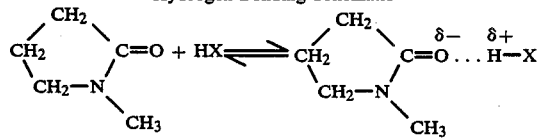

TABLE 7

Lewis Acid AN versus First Heat $T_g$ Values For Fibers from 37% TS Udel ® 3500 (Polysulfone)/NMP Dopes

| Lewis Acid | AN | First Heat $T_g$ (°C.) Duplicates | $O_2$ P/l ($\times 10^6$) | $O_2$ $\alpha_{N_2}$ |
|---|---|---|---|---|
| formamide | 39.8 | 185,186 | 8.3 | 4.7 |
| ethylene carbonate | 22.3 | 163,164 | 4.0 | 2.4 |
| glycerol | 49.4 | 183,183 | 4.7 | 5.0 |
| acetic acid | 52.6,52.9 | 189 | 16.2 | 4.9 |
| propionic acid | 49.1 | 195 | 43 | 5-5.2 |
| butyric acid | 48.3 | 195 | 47.4 | 5.0 |
| isobutyric acid | 47 | 197 | 58.9 | 2.5 |
| 2 chloropropionic acid | 62.4 | — | 47 | 4.3 |
| glutaric acid | 48.2 | — | 1.6 | 4.5 |
| sulfuric acid | 130.1 | 185,186 | 8.5 | 3.5 |

TABLE 8

Effects of Varying PA Concentration in 37% TS Udel ® 3500 Polysulfone/NMP Dopes upon Dope and Membrane Properties

| PA/NMP | | Dope Properties | | Membrane Properties | | |
|---|---|---|---|---|---|---|
| (Molar Ratio) | (% W/W) | Viscosity (CPS @ 70° $\times 10^{-5}$) | g value (g) | First Heat $T_g$ (°C.) | $O_2$ P/l ($\times 10^6$) | $O_2$ $\alpha_{N_2}$ |
| 1.09 | 45/55 | 1.20 | 0.15 | 197 | 45.9 | 4.6 |
| 1.00 | 43/57 | 1.13 | 0.6 | 195 | 43.0 | 5-5.2 |
| 0.89 | 40/60 | 1.07 | 1.1 | 197 | 33.0 | 4.4 |
| 0.72 | 35/65 | — | 2.1 | 197 | 25 | 4.8 |
| 0.42 | 26/74 | — | 2.9 | 187 | 16.3 | 4.3 |
| 0.33 | 20/80 | 0.57 | 4.5 | 187 | 29.6 | 2.6 |

TABLE 9

Effects of Varying Udel ® 3500 Polysulfone Concentration and PA/NMP Ratio On Dope and Membrane Properties

| Polymer Conc. (%) | PA/NMP (Molar ratio) | Dope Properties | | Membrane Properties | | |
|---|---|---|---|---|---|---|
| | | Viscosity (cps @ 70° C. × 10$^{-5}$) | Coag. Value (g) | Macro-voids** (+ or −) | $O_2$ P/l (× 10$^6$) | $O_2$ $\alpha N_2$ |
| 17 | 0.42 | 0.022* | 4.4 | ++ | 25.3 | 3.1 |
| 32 | 0.42 | 0.212 | 4.4 | + | 25.9 | 4.5 |
| 37 | 0.42 | 0.650 | 4.4 | + | 16.3 | 4.3 |
| 32 | 1.0 | 0.40 | 0.6 | + | 33.9 | 4.7 |
| 37 | 1.0 | 1.13 | 0.6 | − | 43.0 | 5–5.2 |

*@ 23° C.
**++ high concentration, + intermediate to low concentration, − macrovoid free.

TABLE 10

The Effect of Lewis A:B Complex Status on the First Heat $T_g$ Of Various Aromatic Sulfone Polymers

| Polymer** | Class | TS (%) | Lewis Acid | A:B Complex Status (Yes or No) | $O_2$P/l (× 10$^6$) | $O_2$ $\alpha N_2$ | First Heat $T_g$ (°C.) |
|---|---|---|---|---|---|---|---|
| Udel ® 3500 | PS | 37 | Formamide | No | 10–12 | 5–5.2 | 171 |
| Udel 3500 | PS | 37 | PA | Yes | 43 | 5–5.2 | 195 |
| Victrex ® 600P | PES | 40 | Formamide | No | 2.3 | 3.4 | 218 |
| Victrex 600P | PES | 40 | PA | Yes | 13.1 | 5.1 | 235 |
| Radel ® A400 | PPS | 37 | Formamide | No | 6.2 | 5.2 | 221 |
| Radel A400 | PPS | 37 | PA | Yes | 20 | 4.4 | 232 |

*Refer to Table 6 for relative complex strength (IR shift)
** $T_g$s of bulk samples of polymers as determined by Differential Scanning Calorimetry (DSC), first/second heats: PS = 191/191; PES = 228/228; PPS = 223/223.

TABLE 11

Comparison of Transport Properties$^a$ for Various Gases For Pl versus Non-Pl Fibers

| | P/l He (× 10$^{-6}$) | He $\alpha N_2$ | P/l $H_2$ (× 10$^{-6}$) | $H_2$ $\alpha N_2$ | P/l $CO_2$ (× 10$^{-6}$) | $CO_2$ $\alpha CH_4$ | $CO_2$ $\alpha C_3H_8$ | P/l $O_2{}^c$ | $O_2$ $\alpha N_2$ |
|---|---|---|---|---|---|---|---|---|---|
| Polsulfone Udel 37% TS | | | | | | | | | |
| Pl 43/57 PA/NMP | 170.0 | 91.0 | 258.0 | 126.0 | 145.0 | 9.8 | 85.0 | 43.0 | 5.2 |
| 87/13 FP/FA | 75.0 | 90.0 | 80.0 | 100.0 | 65.0 | 9.5 | 80.0 | 12.0 | 5.2 |
| Polyethersulfone Victrex 600P | | | | | | | | | |
| Pl 43/57 PA/NMP 40% TS | 84.0 | 182.0 | —$^b$ | — | —$^b$ | — | — | 13.1 | 5.1 |
| 85/15 FP/FA 35% TS | 32.0 | 131.0 | —$^b$ | — | —$^b$ | — | — | 2.3 | 3.4$^d$ |

$^a$Oxygen and nitrogen data obtained at 50° C., feed air (79/21 $O_2/N_2$), 2.9 × 10$^4$ Pa differential pressure. Helium, nitrogen and hydrogen data obtained in pure gas tests at 20–24° C., 4.35 × 10$^4$ Pa differential pressure. $CO_2/CH_4/C_3H_8$ data obtained at 75° C., 4.35 × 10$^4$ Pa differential pressure feed ($CO_2$ 30%, $CH_4$ 66%, $C_3H_8$ 4%). All samples were in test loops containing 10 fibers × 15 cm length, coated with 1% Sylgard in isopentane solution using bore vacuum. Values of P/l and α are averages of from 2 to 6 test loops in each case.
$^b$No data available under comparable test conditions for these samples.
$^c$Test data for $O_2/N_2$ obtained from 1" × 1' modules containing ~1000 fibers × ~26 cm length.
$^d$40% TS polyethersulfone 85/15 NMP/FA.

Table 12 illustrates the improvement in gas separation properties obtained for a styrene-acrylonitrile copolymer hollow fiber membrane fabricated from a Lewis Acid:Base complex solution over a state-of-the-art membrane prepared according to the teaching of Brooks et al in U.S. Pat. No. 4,364,759. In both cases a hollow fiber membrane was fabricated from a solution containing 36% by weight of a copolymer having 47% by weight acrylonitrile into hollow fibers as previously described under the headings Experimental Details—Fiber Spinning.

Fibers were then dried at ambient temperature or slightly above (Ca 50° C.), and the fabricated into 1"×1' test elements containing 600 to 1200 fiber lengths. These elements were then coated from a 0.5% Sylgard solution and tested as previously described. In this case, however, oxygen and nitrogen flux rates were measured at 30° C. and 1.4×10$^4$ Pa ΔP.

TABLE 12

Effect of Lewis A:B Complex on Gas Separation Properties of Acrylonitrile-Styrene Copolymer*

| Non-solvent | Solvent | % w/w | A:B Complex Status (Yes/No) | $O^2$ P/l (× 10$^6$) | $O_2$ $\alpha N_2$ | Coagulation Value g |
|---|---|---|---|---|---|---|
| Formamide | DMF | 25/75 | No | 1.7 | 6.3 | 3.8 |
| Acetic Acid | DMAc | 47/53 | Yes | 10.4 | 6.0 | * | tested °30 C. - 1.4 × 10$^4$ Pa ΔP * 47% by weight acrylonitrile * Because of the cloudiness of solutions of this polymer in the solvent/nonsolvent, no accurate determination of coagulation value could be made by visual observations. Solution cloudy before water addition.

Table 13 shows the improvement in gas separation properties obtainable through the use of the acid:base complex solvent of this invention over properties obtainable using conventional art for the fabrication of hollow fiber membranes from Ultem ® 1000, ( ® Registered Trademark of General Electric Company) a polyethereimide. This polymer has the chemical structure shown below.

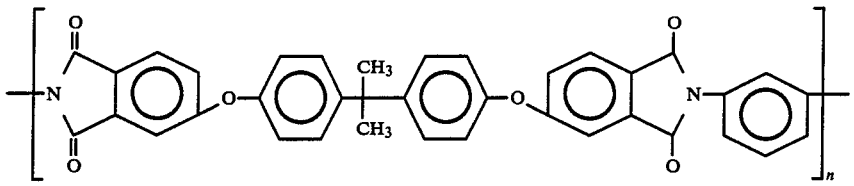

Hollow fiber membranes were produced from 37% by weight polymer solution using techniques as previously described under the headings Experimental Details—Fiber Spinning and were fabricated into 1"×1' test elements. These elements were coated with 0.5% Sylgard and tested for oxygen and nitrogen permeant flux at 30° C. and $1.4 \times 10^4$ to $7.2 \times 10^4$ Pa $\Delta P$. Insufficient oxygen/nitrogen permeate gas flux was obtained at $7.2 \times 10^4$ Pa $\Delta P$ in the first case to obtain an accurate compositional analysis of the permeate gas. Therefore a flux rate was obtained using single component gas feeds of helium and nitrogen. P/l is then calculated as previously described.

(g) drying the membrane at temperatures of from about ambient to about 20° C. below the glass transition temperature.

2. The process according to claim 1 wherein the Lewis acid, Lewis base and the Lewis acid:base complex provides a solvent system having a concentration of from about 0.75:1.0 to about 1.1:1.0 molar ratio of the Lewis acid:base, the concentration of the acid being sufficient to provide a spinning dope of the solvent system and the polymers which is near the gel point.

3. The process according to claim 2 wherein the ratio of the acid is sufficient to lower the coagulation value (g) to less than 2.

4. The process according to claim 1 wherein the Lewis acid, Lewis base, and the Lewis acid:base complex provides a solvent system having a concentration of from 0.75:1.0 to about 1.2:1.0 molar ratio of Lewis acid:base, the concentration on the acid being sufficient

TABLE 13

| | Effect of Lewis A:B Complex on Gas Separation Properties* of Polyetherimide *ULTEM 1000 ® | | | | | | |
|---|---|---|---|---|---|---|---|
| Nonsolvent | Solvent | % w/w | A:B Complex Status Yes or No | $O_2P/l$ $(\times 10^6)$ | $O_2$ $\alpha N_2$ | HeP/l $(\times 10^6)$ | He $\alpha N_2$ | Coagulation Value $-g$ |
| Formamide | NMP | 12/88 | No | NQ | NQ | 3.7 | 20.3 | 1.0 |
| Propionic Acid | NMP | 25/75 | Yes | .5 | 7.9 | 13.5 | 167 | .3 |

*Tested 30° C. $1.4 \times 10^4$ to $7.2 \times 10^4$ Pa NQ Flux Insufficient for Analysis at 500 PSIG
® Registered Trademark of General Electric

We claim:

1. A process for forming asymmetric gas separation membranes having graded density skins and macrovoid free morphology comprised of hydrophobic polymers, the membranes having increased free volume as evidenced by the membrane first heat $T_g$ which is greater than the $T_g$ of a bulk sample of the polymers, comprising:

(a) dissolving the polymers in a solvent solution of Lewis acids and Lewis bases and complexes formed of the Lewis acids and bases, wherein the Lewis acids, Lewis bases, Lewis acid:base complex solvent system has a Hildebrand parameter less than about 1.5 cal$^{\frac{1}{2}}$/cm$^{3/2}$ of the Hildebrand parameter of the polymer;

(b) creating a dope of the solvent system and polymers which is near the gel point, the dope comprised of greater than about 30% by weight total solids sol;

(c) configurating the dope into a form suitable for use as an asymmetric gas separation membrane;

(d) coagulating the formed dope;

(e) desolvating the resulting formed asymmetric gas separation membrane having graded density skin and macrovoid free morphology through rapid disassociation of solvent complex;

(f) washing the membrane at ambient temperatures in a polar medium; and to lower the coagulation value (g) to less than 2.

5. The process according to claim 4 wherein the Lewis acid is comprised of monocarboxylic acids having from 2 to 4 carbon atoms per molecule.

6. The process according to claim 3 wherein the dope is comprised of greater than about 30% by weight of the polymer and the dope has a viscosity of greater than about $5 \times 10^4$ cps at membrane forming temperatures necessary to produce macrovoid free membranes.

7. The process according to claim 3 wherein the desolvating and washing of the formed membrane results in a membrane having less than about 0.5% by weight residual solvent.

8. The process according to claim 3 wherein the Lewis bases are comprised of amide solvents having DN numbers of 27 to 28 and the Lewis acids have AN numbers of from 47 to 53.

9. The process according to claim 3 wherein the Lewis acids have Hildebrand parameters of from about 12 to about 13.5 cal$^{\frac{1}{2}}$/cm$^{3/2}$ and the Lewis bases have Hildebrand parameters of from about 11 to about 12 cal$^{\frac{1}{2}}$/cm$^{3/2}$.

10. The process according to claim 1 wherein the Lewis base constitutes a solvent for the polymer and is selected from the group consisting of N-methyl-2-pyrrolidone, N,N-dimethylacetamide, 1-formylpiperidine, N-methulpiperidone and N-methylcaprolactam.

11. A process for forming hollow fiber asymmetric gas separation membranes having graded density skins and macrovoid-free morphology comprised of hydrophobic polymers, the membranes having increased free volume as evidenced by the membrane first heat $T_g$ which is greater than the $T_g$ of a bulk sample of the polymers, comprising:
 (a) dissolving the polymers is a solvent solution of Lewis acids and Lewis bases and complexes formed of the Lewis acids and Lewis bases wherein the Lewis acid, Lewis base and Lewis acid:base complex solvent system has a Hildebrand parameter less than about 1.5 cal$^{\frac{1}{2}}$/cm$^{3/2}$ of the Hildebrand parameter of the polymer;
 (b) forming a spinning dope of the solvent system and polymers which is near the gel point, the dope comprised of greater than about 30% by weight total solids sol;
 (c) spinning the dope through a tube-in-orifice spinnerette;
 (d) injecting coagulation fluid through the orifice;
 (e) coagulating the spun dope in a coagulation medium and forming the membrane;
 (f) desolvating the formed membrane through rapid disassociation of the complex;
 (g) washing the membrane in a polar medium; and
 (h) drying the membrane at temperatures of from about ambient to about 20° C. below the glass transient temperature.

12. The process according to claim 11 wherein the Lewis acid, Lewis base and the Lewis acid:base complex provides a solvent system having a concentration of from about 0.75:1.0 to about 1.1:1.0 molar ratio of the Lewis acid:base, the concentration of the acid being sufficient to form a spinning dope of the solvent system and the polymers which is near the gel point.

13. The process according to claim 12 wherein the ratio of the acid is sufficient to lower the coagulation value (g) to less than 2.

14. The process according to claim 11 wherein the Lewis acid, Lewis base, and the Lewis acid:base complex provides a solvent system having a concentration of from 0.7:1.0 to about 1.2:1.0 molar ratio of the Lewis acid:base, the concentration of the acid being sufficient to lower the coagulation value (g) to less than 2.

15. The process accoring to claim 13 wherein the Lewis acid is comprised of monocarboxylic acids having from 2 to 4 carbon atoms per molecule.

16. The process according to claim 13 wherein the dope is spun sequentially into a dry air gap and then into a coagulation medium.

17. The process according to claim 13 wherein the dope is spun as a wet process directly into the coagulation medium.

18. The process according to claim 13 wherein the injected coagulation fluid into the orifice of the spinnerette and the coagulation medium into which the dope is spun is comprised of water.

19. The process according to claim 13 wherein the spinning dope is degassed and filtered before spinning.

20. The process according to claim 13 wherein the spinning dope is comprised of greater than about 30 percent by weight of the polymer and the spinning dope has a viscosity of greater than about $5 \times 10^4$ cps at spinning temperatures necessary to produce macrovoid-free membranes.

21. The process according to claim 13 wherein the desolvating and washing of the formed membrane results in a membrane having less than about 0.5 percent by weight residual solvent.

22. The process according to claim 13 wherein the Lewis bases are comprised of amide solvents having DN numbers of 27 to 28 and the Lewis acids have AN numbers of from 47 to 53.

23. The process according to claim 13 wherein the Lewis acids have Hildebrand parameters of from about 12 to about 13.5 cal$^{\frac{1}{2}}$/cm$^{3/2}$ and the Lewis bases have Hildebrand parameters of from about 11 to about 12 cal$^{\frac{1}{2}}$/cm$^{3/2}$.

24. The process according to claim 13 wherein the Lewis base constitutes a solvent for the polymer and is selected from the group consisting of of N-methyl-2-pyrrolidone, N,N-dimethylacetamide, 1-formylpiperidine, N-methylpiperidone and N-methyl caprolactam.

* * * * *